United States Patent
Chang et al.

(10) Patent No.: US 10,965,942 B2
(45) Date of Patent: Mar. 30, 2021

(54) DEVICE AND METHOD FOR CODING VIDEO DATA BASED ON ADJUSTED INTRA MODE LIST

(71) Applicant: FG Innovation Company Limited, Tuen Mun (CN)

(72) Inventors: Yao-Jen Chang, Hsinchu (TW); Hui-Yu Jiang, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 153 days.

(21) Appl. No.: 16/191,462

(22) Filed: Nov. 15, 2018

(65) Prior Publication Data

US 2019/0158828 A1    May 23, 2019

Related U.S. Application Data

(60) Provisional application No. 62/587,676, filed on Nov. 17, 2017.

(51) Int. Cl.
| | |
|---|---|
| *H04N 19/11* | (2014.01) |
| *H04N 19/196* | (2014.01) |
| *H04N 19/463* | (2014.01) |
| *H04N 19/157* | (2014.01) |
| *H04N 19/176* | (2014.01) |

(52) U.S. Cl.
CPC ........... *H04N 19/11* (2014.11); *H04N 19/157* (2014.11); *H04N 19/176* (2014.11); *H04N 19/197* (2014.11); *H04N 19/463* (2014.11)

(58) Field of Classification Search
CPC .. H04N 19/176; H04N 19/105; H04N 19/159; H04N 19/593; H04N 19/11; H04N 19/70; H04N 19/52; H04N 19/46; H04N 19/119

USPC ................... 375/240.02, 240.12, 240.13
See application file for complete search history.

(56) References Cited

U.S. PATENT DOCUMENTS

| | | | | |
|---|---|---|---|---|
| 9,516,318 | B2 * | 12/2016 | Takehara | ............... H04N 19/44 |
| 2013/0114707 | A1 | 5/2013 | Seregin et al. | |
| 2013/0136175 | A1 | 5/2013 | Wang et al. | |
| 2014/0098865 | A1 * | 4/2014 | Kumakura | ............. H04N 19/11 |
| | | | | 375/240.12 |
| 2014/0219342 | A1 * | 8/2014 | Yu | ........................ H04N 19/176 |
| | | | | 375/240.12 |
| 2016/0330445 | A1 * | 11/2016 | Ugur | ..................... H04N 19/176 |
| 2016/0373741 | A1 * | 12/2016 | Zhao | ...................... H04N 19/11 |
| 2016/0373742 | A1 * | 12/2016 | Zhao | ..................... H04N 19/176 |
| 2016/0373743 | A1 * | 12/2016 | Zhao | ...................... H04N 19/11 |

(Continued)

FOREIGN PATENT DOCUMENTS

| | | |
|---|---|---|
| CN | 104581181 A | 4/2015 |
| WO | 2016195460 A | 12/2016 |

*Primary Examiner* — Daniel Chang
(74) *Attorney, Agent, or Firm* — ScienBiziP, P.C.

(57) ABSTRACT

A method of decoding a bitstream by an electronic device includes determining a block unit having a block height and a block width from an image frame according to the bitstream. A mode list including a plurality of intra modes is determined for reconstructing the block unit. At least one of the intra modes is selected from the mode list based on a comparison between the block height and the block width, and removed from the mode list to generate an adjusted list including a plurality of unselected modes. The block unit included in the image frame is reconstructed based on the adjusted list.

18 Claims, 10 Drawing Sheets

(56) References Cited

U.S. PATENT DOCUMENTS

2016/0373769 A1* 12/2016 Zhao .................... H04N 19/463
2016/0373770 A1* 12/2016 Zhao .................... H04N 19/593
2016/0373782 A1* 12/2016 Zhao .................... H04N 19/463
2017/0332084 A1* 11/2017 Seregin ................ H04N 19/159

* cited by examiner

DEVICE AND METHOD FOR CODING VIDEO DATA BASED ON ADJUSTED INTRA MODE LIST

CROSS-REFERENCE TO RELATED APPLICATION(S)

The present application claims the benefit of and priority to a provisional U.S. Patent Application Ser. No. 62/587,676 filed on Nov. 17, 2017, entitled "Intra Prediction Generation Method", (hereinafter referred to as "US72311 application"). The disclosure of the US72311 application is hereby incorporated fully by reference into the present application.

FIELD

The present disclosure generally relates to video coding, and more particularly, to techniques for intra prediction based on an adjusted intra mode list.

BACKGROUND

The intra prediction is a coding tool in a video coding method. In the conventional video coding method, an encoder and a decoder only use the previously reconstructed pixels in a closest pixel line adjacent to a coding block to generate reference pixels and predictors for predicting or reconstructing the coding block along an orientation. However, the orientation is selected from a plurality of intra modes included in a predefined mode list. Thus, the encoder needs to adjust the predefined mode list for adapting different coding blocks. When the encoder adjusts the predefined mode list for adapting different coding blocks, the decoder needs to adjust the predefined mode list for adapting different coding blocks in the same way.

SUMMARY

The present disclosure is directed to a device and method for coding video data based on multiple reference lines.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

DETAILED DESCRIPTION

Figure 1:
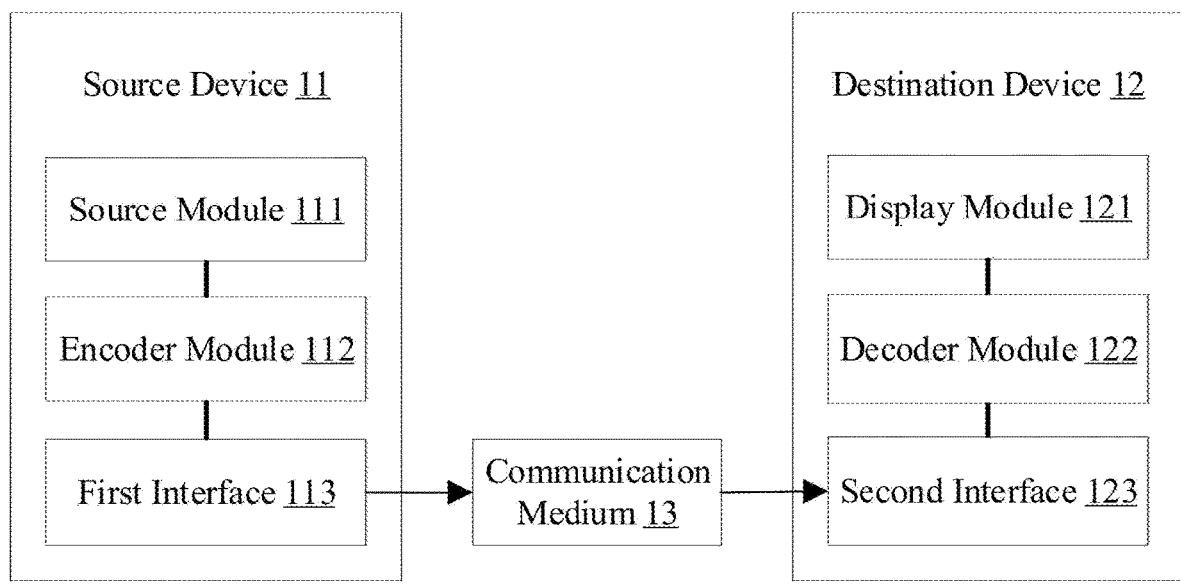
FIG. 1 is a block diagram of an exemplary implementation of a system configured to encode and decode video data according to one or more techniques of this disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any coding function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 is a block diagram of an exemplary implementation of a system that may be configured to encode and decode video data according to one or more techniques of this disclosure. In the implementation, the system includes a source device 11, a destination device 12, and communication medium 13. In at least one implementation, the source device 11 may include any device configured to encode video data and transmit encoded video data to the communication medium 13. In at least one implementation, the destination device 12 may include any device configured to receive encoded video data via the communication medium 13 and to decode encoded video data.

In at least one implementation, the source device 11 may wiredly and/or wirelessly communicate with the destination device 12 via the communication medium 13. The source device 11 may include a source module 111, an encoder module 112, and a first interface 113. The destination device 12 may include a display module 121, a decoder module 122, and a second interface 123. In at least one implementation, the source device 11 may be a video encoder, and the destination device 12 may be a video decoder.

In at least one implementation, the source device 11 and/or the destination device 12 may be a mobile phone, a tablet, a desktop, a notebook, or other electronic device. FIG. 1 merely illustrates one example of the source device 11 and the destination device 12, and the source device 11 and the destination device 12 in other implementations may include more or less components than illustrated, or have a different configuration of the various components.

In at least one implementation, the source module 111 of the source device 11 may include a video capture device to capture a new video, a video archive storing previously captured video, and/or a video feed interface to receive video from a video content provider. In at least one implementation, the source module 111 of the source device 11 may generate computer graphics-based data as the source video, or a combination of live video, archived video, and computer-generated video. In at least one implementation, the video capturing device may be a charge-coupled device (CCD) image sensor, a complementary metal-oxide-semiconductor (CMOS) image sensor, or a camera.

In at least one implementation, the encoder module 112 and the decoder module 122 may each be implemented as any of a variety of suitable encoder/decoder circuitry, such as one or more microprocessors, a central processing unit (CPU), a graphic processing unit (GPU), a system on chip (SoC), digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. In at least one implementation, each of the encoder module 112 and the decoder module 122 may be included in one or more encoders or decoders, any of which may be integrated as part of a combined encoder/decoder (CODEC) in a respective device.

In at least one implementation, the first interface 113 and the second interface 123 may adopt customized protocols or follow existing standards or de facto standards including, but not limited to, Ethernet, IEEE 802.11 or IEEE 802.15 series, Wireless USB or telecommunication standards including, but not limited to, GSM, CDMA2000, TD-SCDMA, WiMAX, 3GPP-LTE or TD-LTE. In at least one implementation, the first interface 113 and the second interface 123 may each include any device configured to transmit and/or store a compliant video bitstream to the communication medium 13 and to receive the compliant video bitstream from the communication medium 13. In at least one implementation, the first interface 113 and the second interface 123 may include a computer system interface that may enable a compliant video bitstream to be stored on a storage device or to be received from the storage device. For example, the first interface 113 and the second interface 123 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

In at least one implementation, the display module 121 may include a display using liquid crystal display (LCD) technology, a plasma display technology, an organic light emitting diode (OLED) display technology, or light emitting polymer display (LPD) technology, although other display technologies may be used in other implementations. In at least one implementation, the display module 121 may include a high definition display or an ultra high definition display.

Figure 2:
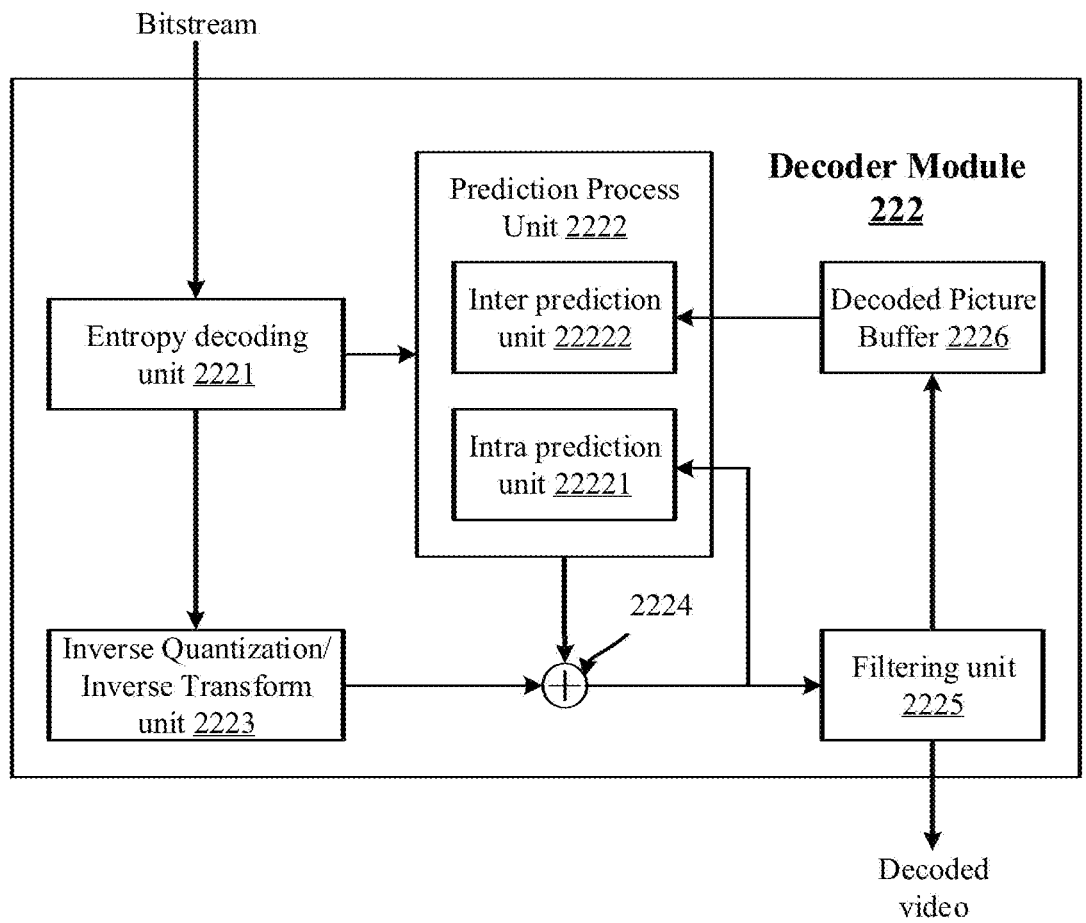
FIG. 2 is a block diagram of an exemplary implementation of the decoder module of the destination device in the system of FIG. 1.

FIG. 2 is a block diagram of a decoder module 222 representing an exemplary implementation of the decoder module 122 of the destination device 12 in the system of FIG. 1. In at least one implementation, the decoder module 222 includes an entropy decoding unit 2221, a prediction process unit 2222, an inverse quantization/inverse transform unit 2223, a first summer 2224, a filtering unit 2225, and a decoded picture buffer 2226. In at least one implementation, the prediction process unit 2222 of the decoder module 222 further includes an intra prediction unit 22221, and an inter prediction unit 22222. In at least one implementation, the decoder module 222 receives a bitstream, and decodes the bitstream to output a decoded video.

In at least one implementation, the entropy decoding unit 2221 may receive the bitstream including a plurality of syntax elements from the second interface 123 in FIG. 1, and perform a parsing operation on the bitstream to extract syntax elements from the bitstream. As part of performing the parsing operation, the entropy decoding unit 2221 may entropy decode the bitstream to generate quantized transform coefficients, quantization parameters, transform data, motion vectors, intra modes, partition information, and other syntax information. In at least one implementation, the entropy decoding unit 2221 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique to generate the quantized transform coefficients. In at least one implementation, the entropy decoding unit 2221 provides the quantized transform coefficients, the quantization parameters, and the transform data to the inverse quantization/inverse transform unit 2223, and provides the motion vectors, the intra modes, the partition information, and other syntax information to the prediction process unit 2222.

In at least one implementation, the prediction process unit 2222 may receive syntax elements, such as motion vectors, intra modes, partition information, and other syntax information, from the entropy decoding unit 2221. In at least one implementation, the prediction process unit 2222 may receive the syntax elements including the partition information, and then divide image frames according to the partition information. In at least one implementation, each of the image frames may be divided into at least one image block according to the partition information. The at least one image block may include a luminance block for reconstructing a plurality of luminance samples, and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

In at least one implementation, during the decoding process, the prediction process unit 2222 receives predicted data including the intra mode or the motion vector for a current image block of a specific one of the image frames. The current image block may be one of the luminance block and the at least one of the chrominance block in the specific image frame.

In at least one implementation, the intra prediction unit 22221 may perform intra-predictive coding of a current block unit relative to one or more neighboring blocks in the same frame as the current block unit based on the syntax elements related to the intra mode to generate a predicted block. In at least one implementation, the intra mode may specify the location of reference samples selected from the neighboring blocks within the current frame.

In at least one implementation, the intra prediction unit 22221 may reconstruct a plurality of chroma components of the current block unit based on the plurality of luma components of the current block unit, when the luma components of the current block are reconstructed by the prediction process unit 2222.

In at least one implementation, the inter prediction unit 22222 may perform inter-predictive coding of the current block unit relative to one or more blocks in one or more reference image block based on the syntax elements related to the motion vector to generate the predicted block. In at least one implementation, the motion vector may indicate a displacement of the current block unit within the current image block relative to a reference block unit within the reference image block. The reference block unit is a block that is determined to closely match the current block unit. In at least one implementation, the inter prediction unit 22222 receives the reference image block stored in the decoded picture buffer 2226 and reconstructs the current block unit based on the received reference image blocks.

In at least one implementation, the inverse quantization/inverse transform unit 2223 may apply inverse quantization and inverse transformation to reconstruct the residual block in the pixel domain. In at least one implementation, the inverse quantization/inverse transform unit 2223 may apply inverse quantization to the residual quantized transform coefficient to generate a residual transform coefficient, and then apply inverse transformation to the residual transform coefficient to generate the residual block in the pixel domain. In at least one implementation, the inverse transformation may be inversely applied the transformation process, such as discrete cosine transform (DCT), discrete sine transform (DST), adaptive multiple transform (AMT), mode-dependent non-separable secondary transform (MDNSST), hypercube-givens transform (HyGT), signal dependent transform, Karhunen-Loéve transform (KLT), wavelet transform, integer transform, sub-band transform or a conceptually similar transform. In at least one implementation, the inverse transformation may convert the residual information from a transform domain, such as a frequency domain, back to the pixel domain. In at least one implementation, the degree of inverse quantization may be modified by adjusting a quantization parameter.

In at least one implementation, the first summer 2224 adds the reconstructed residual block to the predicted block provided from the prediction process unit 2222 to produce a reconstructed block.

In at least one implementation, the filtering unit 2225 may include a deblocking filter, a sample adaptive offset (SAO) filter, a bilateral filter, and/or an adaptive loop filter (ALF) to remove blockiness artifacts from the reconstructed block. Additional filters (in loop or post loop) may also be used in addition to the deblocking filter, the SAO filter, the bilateral filter and the ALF. Such filters are not shown for brevity, but if desired, may filter the output of the first summer 2224. In at least one implementation, the filtering unit 2225 may output the decoded video to the display module 121 or other video receiving unit, after the filtering unit 2225 performs the filtering process for the reconstructed blocks of the specific image frame.

In at least one implementation, the decoded picture buffer 2226 may be a reference picture memory that stores the reference block for use in decoding the bitstream by the prediction process unit 2222, e.g., in inter-coding modes. The decoded picture buffer 2226 may be formed by any of a variety of memory devices, such as dynamic random access memory (DRAM), including synchronous DRAM (SDRAM), magneto-resistive RAM (MRAM), resistive RAM (RRAM), or other types of memory devices. In at least one implementation, the decoded picture buffer 2226 may be on-chip with other components of the decoder module 222, or off-chip relative to those components.

Figure 3:
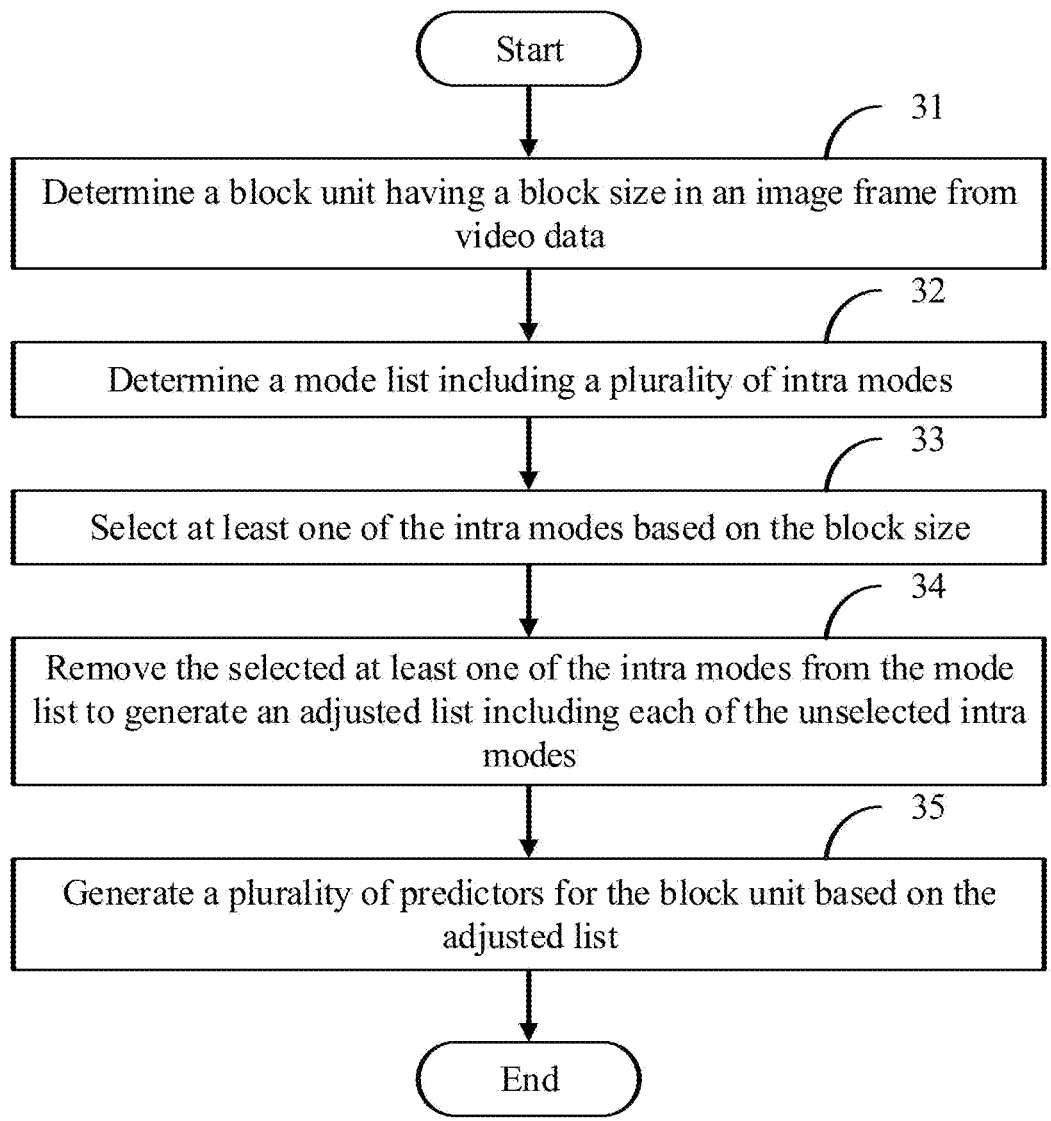
FIG. 3 illustrates a flowchart in accordance with a first exemplary implementation of the mode list adjustment for intra prediction.

FIG. 3 illustrates a flowchart in accordance with a first exemplary implementation of the mode list adjustment for intra prediction. The example method is provided by way of example only, as there are a variety of ways to carry out the method. The method described below may be carried out using the configuration illustrated in FIG. 1 and FIG. 2, for example, and various elements of these figures are referenced in explaining the example method. Each block shown in FIG. 3 represents one or more processes, methods, or subroutines, carried out in the example method. Furthermore, the order of blocks is illustrative only and may change. Additional blocks may be added or less blocks may be utilized without departing from this disclosure.

At block 31, the decoder module 222 determines a block unit having a block size in an image frame from video data.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indication in the bitstream. For example, the decoder module 222 may divide the image frames to generate a plurality of coding tree units, and further divide one of the coding tree units to determine the block unit having the block size according to the partition indications based on any video coding standard. In at least one implementation, the block size may include a block height and a block width.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 32, the intra prediction unit 22221 determines a mode list including a plurality of intra modes.

In at least one implementation, the intra modes in the mode list may be predefined in the destination device 12 and the source device 11. For example, the intra modes may be predefined as a planar mode, a DC mode, and/or a plurality of directional modes. In at least one implementation, the number of directional modes may be equal to 33, when the decoder module 222 decodes the bitstream in high efficiency video coding (HEVC). In at least one implementation, the number of directional modes may be equal to 65, when the decoder module 222 decodes the bitstream in versatile video coding (VVC) test model (VTM).

In at least one implementation, each of the intra modes has a first intra prediction index. In one implementation, the first intra prediction indices of the intra modes may be equal to 0 to 34, when the decoder module 222 decodes the bitstream in HEVC. In the implementation, the first intra prediction indices of the planer modes and the DC mode may be equal to 0 and 1, and the first intra prediction indices of the directional modes may be equal to 2 to 33. In one implementation, the first intra prediction indices of the intra modes may be equal to 0 to 66, when the decoder module 222 decodes the bitstream in VTM. In the implementation, the first intra prediction indices of the planer modes and the DC mode may be equal to 0 and 1, and the first intra prediction indices of the directional modes may be equal to 2 to 66.

At block 33, the intra prediction unit 22221 selects at least one of the intra modes based on the block size.

In at least one implementation, the intra prediction unit 22221 may determine the selected intra modes based on the block size. In at least one implementation, the intra prediction unit 22221 may compare the block size with a predefined size, and determine the selected intra modes based on the comparison between the block size and the predefined size. When the block size is larger than the predefined size, the selected intra modes may be at least one first selected mode selected by the intra prediction unit 22221. When the block size is smaller than the predefined size, the selected intra modes may be at least one second selected mode selected by the intra prediction unit 22221. In the implementation, each of the at least one second selected mode may be different from the at least one first selected mode.

In at least one implementation, the intra prediction unit 22221 may compare the block width with the block height, and determine the selected intra modes based on the comparison between the block width and the block height. When the block width is longer than the block height, the selected intra modes may be at least one third selected mode selected by the intra prediction unit 22221. When the block width is shorter than the block height, the selected intra modes may be at least one fourth selected mode selected by the intra prediction unit 22221. In the implementation, each of the at least one fourth selected mode may be different from the at least one third selected mode.

At block 34, the intra prediction unit 22221 removes the selected at least one of the intra modes from the mode list to generate an adjusted list including each of the unselected intra modes.

In at least one implementation, a plurality of remaining intra modes in the mode list may be the unselected intra modes, when the intra prediction unit 22221 removes all of the selected intra modes from the mode list. In the implementation, the intra prediction unit 22221 may generate the adjusted list to include the unselected intra modes. In at least one implementation, the intra prediction unit 22221 may add a plurality of additional modes based on the block size into the adjusted list.

In at least one implementation, the intra prediction unit 22221 may set a second intra prediction index for each of the unselected intra modes. In the implementation, the second intra prediction indices of the unselected intra modes may be identical to or different from the first intra prediction indices of the unselected intra modes. In at least one implementation, the intra prediction unit 22221 may set the second intra prediction index for each of the additional modes.

At block 35, the intra prediction unit 22221 generates a plurality of predictors for the block unit based on the adjusted list.

In at least one implementation, the intra prediction unit 22221 may determine the prediction indications from the bitstream. In one implementation, the intra prediction unit 22221 may determine, based on a specific one of the prediction indications, one of the unselected intra modes in the adjusted list derived according to the block size. In another implementation, the intra prediction unit 22221 may determine, based on the specific prediction indication, one of the unselected intra modes and the additional modes in the adjusted list derived according to the block size. In at least one implementation, the specific prediction indication indicates a mode index identical to the second intra prediction index of the determined mode. Thus, the intra prediction unit 22221 may derive the determined mode based on the mode index. In at least one implementation, the mode index indicated by the specific prediction indication may be identical to the first intra prediction index of the determined mode.

In at least one implementation, the block unit may include a plurality of block elements. In the implementation, each of the block elements may be a pixel element. In at least one implementation, the intra prediction unit 22221 may determine, along an orientation of the determined mode derived for the block unit, one of the predictors based on a plurality of neighboring blocks neighboring with the block unit for each of the block elements. In one implementation, the determined mode may be the determined one of the unselected intra modes in the adjusted list derived according to the block size. In another implementation, the determined mode may be the determined one of the unselected intra modes and the additional modes in the adjusted list derived according to the block size.

In at least one implementation, the first summer 2224 of the decoder module 222 in the destination device 12 may add the predictors derived based on the determined mode into a plurality of residual samples determined from the bitstream to reconstruct the block unit. In addition, the decoder module 222 may reconstruct all of the other block units in the image frame for reconstructing the image frame and the video.

Figure 4:
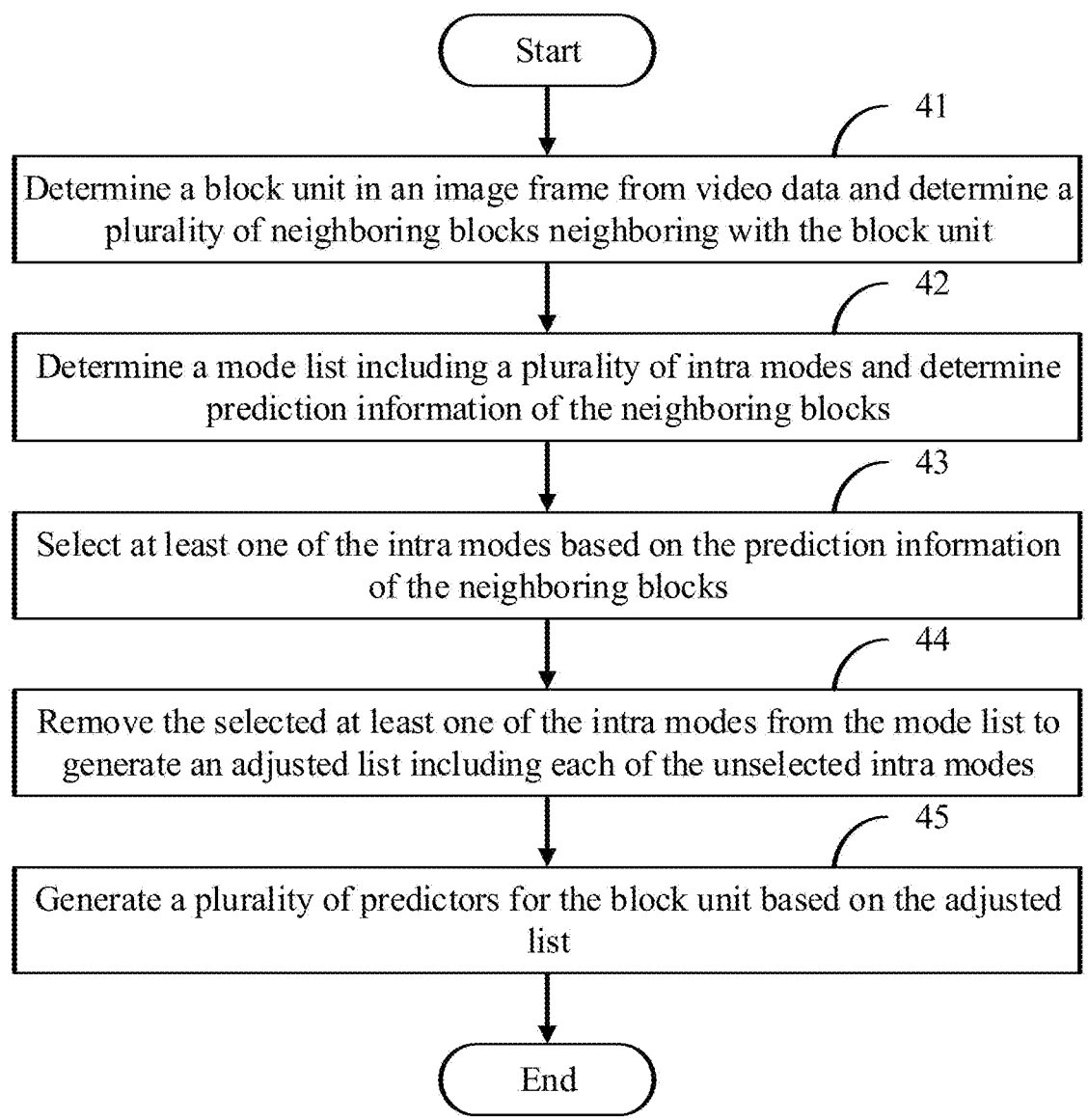
FIG. 4 illustrates a flowchart in accordance with a second exemplary implementation of the mode list adjustment for intra prediction.

FIG. 4 illustrates a flowchart in accordance with a second exemplary implementation of the mode list adjustment for intra prediction. The example method is provided by way of example only, as there are a variety of ways to carry out the method. The method described below may be carried out using the configuration illustrated in FIG. 1 and FIG. 2, for example, and various elements of these figures are referenced in explaining the example method. Each block shown in FIG. 4 represents one or more processes, methods, or subroutines, carried out in the example method. Furthermore, the order of blocks is illustrative only and may change. Additional blocks may be added or less blocks may be utilized without departing from this disclosure.

At block 41, the decoder module 222 determines a block unit in an image frame from video data, and determines a plurality of neighboring blocks neighboring with the block unit.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indication in the bitstream. For example, the decoder module 222 may divide the image frames to generate a plurality of coding tree units, and further divide one of the coding tree units to determine the block unit having the block size according to the partition indications based on any video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

In at least one implementation, the prediction process unit 2222 of the destination device 12 determines the neighboring blocks neighboring with the block unit. In the implementation, the neighboring blocks may be included in a plurality of reference lines. In the implementation, the neighboring blocks in a first one of the reference lines is adjacent to the block unit, and the neighboring blocks in a second one of the reference lines is adjacent to the neighboring blocks in the first reference line. In at least one implementation, the neighboring blocks may be reconstructed prior to reconstructing the block unit, so the neighboring blocks may be a plurality of reference samples for reconstructing the block unit. In at least one implementation, the block unit may be reconstructed prior to reconstructing some of the neighboring blocks, so the intra prediction unit 22221 may generate the reference samples of the block unit for the unreconstructed neighboring blocks by padding with the reconstructed neighboring blocks.

At block 42, the intra prediction unit 22221 determines a mode list including a plurality of intra modes, and determines prediction information of the neighboring blocks.

In at least one implementation, the intra modes in the mode list may be predefined in the destination device 12 and the source device 11. For example, the intra modes may be predefined as a planar mode, a DC mode, and a plurality of directional modes. In at least one implementation, the number of directional modes may be equal to 33, when the decoder module 222 decodes the bitstream in HEVC. In at least one implementation, the number of directional modes may be equal to 65, when the decoder module 222 decodes the bitstream in VTM.

In at least one implementation, each of the intra modes has a first intra prediction index. In one implementation, the first intra prediction indices of the intra modes may be equal to 0 to 34, when the decoder module 222 decodes the bitstream in HEVC. In the implementation, the first intra prediction indices of the planer modes and the DC mode may be equal to 0 and 1, and the first intra prediction indices of the directional modes may be equal to 2 to 33. In one implementation, the first intra prediction indices of the intra modes may be equal to 0 to 66, when the decoder module 222 decodes the bitstream in VTM. In the implementation, the first intra prediction indices of the planer modes and the DC mode may be equal to 0 and 1, and the first intra prediction indices of the directional modes may be equal to 2 to 66.

In at least one implementation, the prediction information of the neighboring blocks may include a plurality of decoded modes of the neighboring blocks. In one implementation, the prediction information may further include a plurality of prediction modes of the neighboring blocks, when the decoded modes of the neighboring blocks are the intra prediction. In the implementation, the prediction modes are selected from the intra modes in the mode list for reconstructing the neighboring blocks. In at least one implementation, the intra prediction unit 22221 may check the prediction modes of the neighboring blocks, and determine a plurality of most probable modes (MPMs) based on the prediction modes of the neighboring blocks for the block unit. In one implementation, the intra prediction unit 22221 may bypass a specific one of the neighboring blocks and check the decoded modes of the other neighboring blocks, when the decoded mode of the specific neighboring block is the inter prediction.

In at least one implementation, the prediction information of the neighboring blocks may be any information used to determine whether the neighboring blocks are reconstructed. For example, the intra prediction unit 22221 may directly receive a plurality of reconstructed components of the neighboring blocks generated by the first summer 2224. When the intra prediction unit 22221 receives the reconstructed components of the neighboring blocks, the intra prediction unit 22221 may determine that the neighboring blocks are reconstructed prior to reconstructing the block unit. When the intra prediction unit 22221 does not receive the reconstructed components of the neighboring blocks, the intra prediction unit 22221 may determine that the neighboring blocks are not reconstructed prior to reconstructing the block unit. In one implementation, the reconstructed components of the neighboring blocks may be used to generate a plurality of reference samples of the block unit, when all of the neighboring blocks have been reconstructed prior to reconstructing the block unit. In other implementations, a specific one of the neighboring blocks may not be used to generate the reference samples, when the specific neighboring block has not been reconstructed during reconstructing the block unit. In the implementation, the intra prediction unit 22221 may generate a specific one of the reference samples corresponding to the specific neighboring block by padding with the other neighboring blocks.

At block 43, the intra prediction unit 22221 selects at least one of the intra modes based on the prediction information of the neighboring blocks.

In at least one implementation, the intra prediction unit 22221 may determine the selected intra modes based on the prediction information of the neighboring blocks. In the implementation, each of the directional modes includes an orientation. In at least one implementation, the intra prediction unit 22221 may compare the orientations of the MPMs with the orientations of the directional modes, and determine the selected intra modes based on the comparison between the orientations of the MPMs and the orientations of the directional modes. For example, a specific one of the directional modes may be one of the selected intra modes, if the specific directional mode is far from the MPMs. In one implementation, each of the intra modes may be divided into a plurality of mode groups. When a specific one of the mode groups do not include the MPMs, the intra prediction unit 22221 may select the specific directional mode from the specific mode group and set the specific directional mode as the selected intra modes.

In at least one implementation, the intra prediction unit 22221 may determine which of the neighboring blocks has not been reconstructed during reconstructing the block unit. In the implementation, the intra prediction unit 22221 may further determine which of the intra modes directs from the block unit to the determined neighboring blocks. In at least one implementation, the intra prediction unit 22221 may set the determined intra modes as the selected intra modes.

At block 44, the intra prediction unit 22221 removes the selected at least one of the intra modes from the mode list to generate an adjusted list including each of the unselected intra modes.

In at least one implementation, a plurality of remaining intra modes in the mode list may be the unselected intra modes, when the intra prediction unit 22221 removes all of the selected intra modes from the mode list. In the implementation, the intra prediction unit 22221 may generate the adjusted list to include the unselected intra modes. In at least one implementation, the intra prediction unit 22221 may add a plurality of additional modes based on the block size into the adjusted list.

In at least one implementation, the intra prediction unit 22221 may set a second intra prediction index for each of the unselected intra modes. In the implementation, the second intra prediction indices of the unselected intra modes may be identical to or different from the first intra prediction indices of the unselected intra modes. In at least one implementation, the intra prediction unit 22221 may set the second intra prediction index for each of the additional modes.

At block 45, the intra prediction unit 22221 generates a plurality of predictors for the block unit based on the adjusted list.

In at least one implementation, the intra prediction unit 22221 may determine the prediction indications from the bitstream. In one implementation, the intra prediction unit 22221 may determine, based on a specific one of the prediction indications, one of the unselected intra modes in the adjusted list derived according to the prediction information of the neighboring blocks. In another implementation, the intra prediction unit 22221 may determine, based on the specific prediction indication, one of the unselected intra modes and the additional modes in the adjusted list derived according to the prediction information of the neighboring blocks. In at least one implementation, the specific prediction indication indicates a mode index identical to the second intra prediction index of the determined mode. Thus, the intra prediction unit 22221 may derive the determined mode based on the mode index. In at least one implementation, the mode index indicated by the specific prediction indication may be identical to the first intra prediction index of the determined mode.

In at least one implementation, the block unit may include a plurality of block elements. In the implementation, each of the block elements may be a pixel element. In at least one implementation, the intra prediction unit 22221 may determine, along a specific one of the orientations of the determined mode derived for the block unit, one of the predictors based on the neighboring blocks neighboring with the block unit for each of the block elements. In one implementation, the determined mode may be the determined one of the unselected intra modes in the adjusted list derived according to the prediction information of the neighboring blocks. In another implementation, the determined mode may be the determined one of the unselected intra modes and the additional modes in the adjusted list derived according to the prediction information of the neighboring blocks.

In at least one implementation, the first summer 2224 of the decoder module 222 in the destination device 12 may add the predictors derived based on the determined mode into a plurality of residual samples determined from the bitstream to reconstruct the block unit. In addition, the decoder module 222 may reconstruct all of the other block units in the image frame for reconstructing the image frame and the video.

Figure 5:
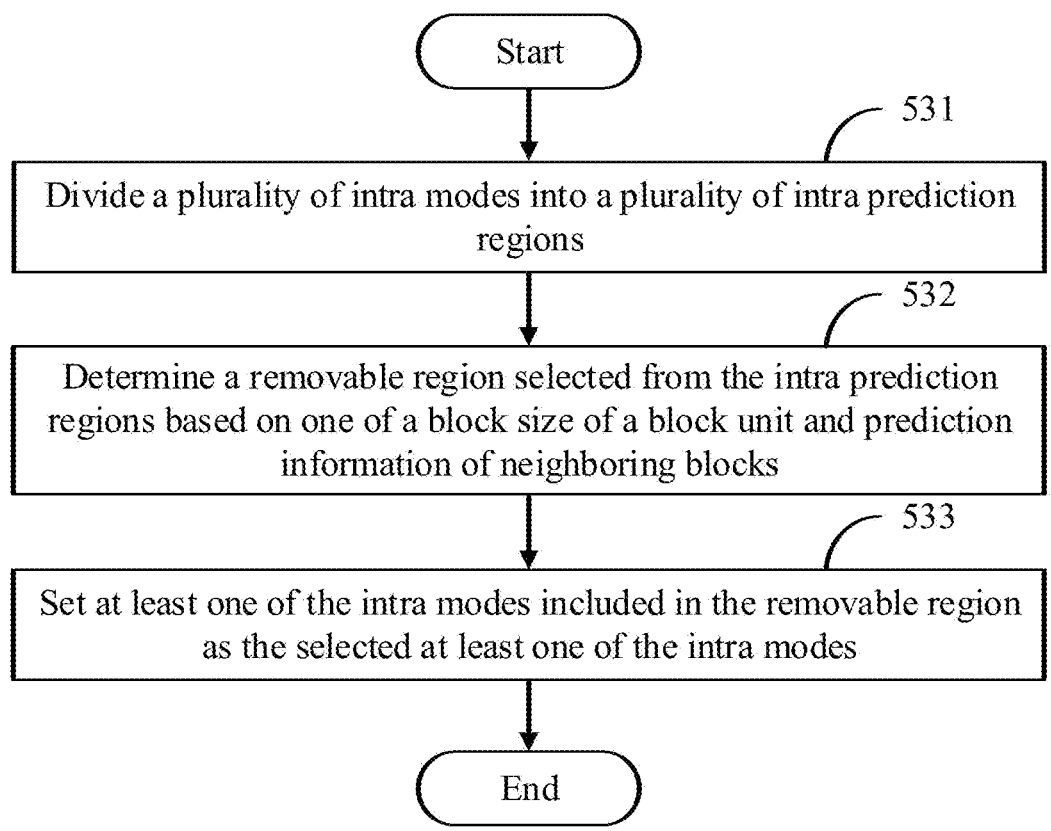
FIG. 5 illustrates a flowchart in accordance with a third exemplary implementation of the mode list adjustment for intra prediction.

FIG. 5 illustrates a flowchart in accordance with a third exemplary implementation of the mode list adjustment for intra prediction. The example method is provided by way of example, as there are a variety of ways to carry out the method. The method described below may be carried out using the configuration illustrated in FIG. 1 and FIG. 2, for example, and various elements of these figures are referenced in explaining the example method. Each block shown in FIG. 5 represents one or more processes, methods, or subroutines, carried out in the example method. Furthermore, the order of blocks is illustrative only and may change. Additional blocks may be added, or less blocks may be utilized without departing from this disclosure. In at least one implementation, FIG. 5 may be a detailed exemplary implementation of block 33 in FIG. 3 and/or block 43 in FIG. 4.

At block 531, the intra prediction unit 22221 divides a plurality of intra modes into a plurality of intra prediction regions.

In at least one implementation, the intra modes in a mode list may be predefined in the destination device 12 and the source device 11. For example, the intra modes may be predefined as a planar mode, a DC mode, and a plurality of directional modes. In at least one implementation, the number of directional modes may be equal to 33, when the decoder module 222 decodes the bitstream in HEVC. In at least one implementation, the number of directional modes may be equal to 65, when the decoder module 222 decodes the bitstream in VTM.

In at least one implementation, each of the intra modes has a first intra prediction index. In one implementation, the first intra prediction indices of the intra modes may be equal to 0 to 34, when the decoder module 222 decodes the bitstream in HEVC. In the implementation, the first intra prediction indices of the planer modes and the DC mode may be equal to 0 and 1, and the first intra prediction indices of the directional modes may be equal to 2 to 33. In one implementation, the first intra prediction indices of the intra modes may be equal to 0 to 66, when the decoder module 222 decodes the bitstream in VTM. In the implementation, the first intra prediction indices of the planer modes and the DC mode may be equal to 0 and 1, and the first intra prediction indices of the directional modes may be equal to 2 to 66.

Figure 6A:
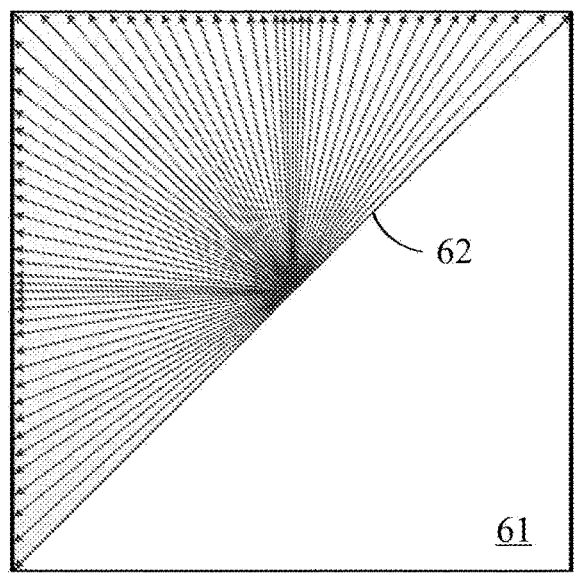
FIGS. 6A, 6B and 6C are schematic illustrations of exemplary implementations of the intra modes of the block unit divided into four intra prediction regions and six intra prediction regions.
Figure 6B:
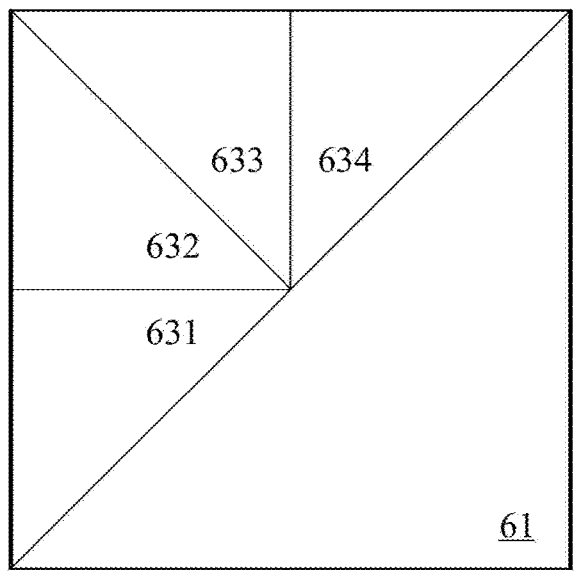
Figure 6C:
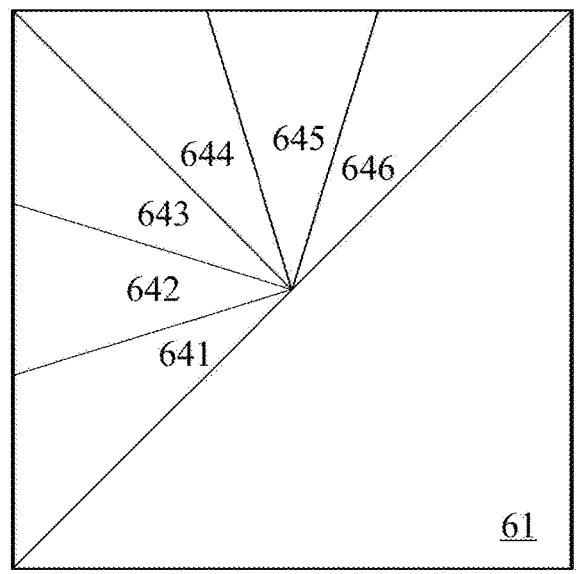

In at least one implementation, each of the directional modes has an orientation. In the at least one implementation, the intra prediction unit 22221 may divide the directional modes into the intra prediction regions. In the implementation, the number of the intra prediction regions may be predefined in the destination device 12 and the source device 11. For example, the number of the intra prediction regions may be equal to 4, 6, or 13. FIGS. 6A, 6B and 6C are schematic illustrations of exemplary implementations of the intra modes 62 of the block unit 61 divided into four intra prediction regions 631-634 or six intra prediction regions 641-646. In at least one implementation, the first one of the intra prediction regions 631-634 may include the intra modes having the intra prediction indices 2 to 17, the last one of the intra prediction regions 631-634 may include the intra modes having the intra prediction indices 51 to 66, and the others of the intra prediction regions 631-634 may include the intra modes having the intra prediction indices 18 to 50. In at least one implementation, the first one of the intra prediction regions 641-646 may include the intra modes having the intra prediction indices 2 to 11, the last one of the intra prediction regions 641-646 may include the intra modes having the intra prediction indices 57 to 66, and the others of the intra prediction regions 641-646 may include the intra modes having the intra prediction indices 12 to 56. In at least one implementation, the intra prediction regions 632-633 and the intra prediction regions 642-645 may be set as a plurality of middle regions.

At block 532, the intra prediction unit 22221 determines a removable region selected from the intra prediction regions based on one of a block size of a block unit and prediction information of neighboring blocks.

In at least one implementation, the block size may be compared with a predefined size, when the intra prediction unit 22221 determines the removable region based on the block size of the block unit. In the implementation, the intra prediction unit 22221 may determine the removable region based on the comparison between the block size and the predefined size. In one implementation, the removable region may be predefined to include at least one of the first intra prediction region and the last intra prediction region, when the block size is larger than the predefined size. In another implementation, the removable region may be predefined to include at least one of the intra prediction regions, when the block size is larger than the predefined size. In addition, the removable region may be predefined to include at least one of the middle regions, when the block size is smaller than the predefined size. In another implementation, the removable region may be predefined to include at least one of the intra prediction region, when the block size is smaller than the predefined size.

In at least one implementation, a block width of the block size may be compared with a block height of the block size, when the intra prediction unit 22221 determines the removable region based on the block size of the block unit. In at least one implementation, the intra prediction unit 22221 may determine the removable region based on the comparison between the block width and the block height. In at least one implementation, the removable region may be predefined to include at least one of the first intra prediction region 641 to the third intra prediction region 643, when the block width is longer than the block height. In another implementation, the removable region may be predefined to include at least one of the fourth intra prediction region 644 to the sixth intra prediction region 646, when the block width is shorter than the block height. For example, the removable region may be predefined to include the first intra prediction region 641, when the block width is longer than the block height. In addition, the removable region may be predefined to include the sixth intra prediction region 646, when the block width is shorter than the block height. In at least one implementation, the removable region may be predefined to include at least one of the first intra prediction region 631 and the second intra prediction region 632, when the block width is longer than the block height. In another implementation, the removable region may be predefined to include at least one of the third intra prediction region 633 and the fourth intra prediction region 634, when the block width is shorter than the block height.

In at least one implementation, a first specific one of the intra prediction regions may be predefined as the removable region, when the block width is longer than the block height. In addition, a second specific one of the intra prediction regions different from the first specific intra prediction region may be predefined as the removable region, when the block width is shorter than the block height. In the implementation, a first angle between a horizontal direction and each of the plurality of intra modes in the first specific intra prediction regions is equal to or less than 45 degrees, and a second angle between a vertical direction and each of the plurality of intra modes in the second specific intra prediction regions is equal to or less than 45 degrees.

In at least one implementation, the intra prediction unit 22221 may determine a plurality of most probable modes (MPMs) based on a plurality of prediction modes of the neighboring blocks neighboring with the block unit, when the intra prediction unit 22221 determines the removable region based on the prediction information of the neighboring blocks. In the implementation, the prediction information may include the prediction modes of the neighboring blocks, and each of the prediction modes has an orientation. In at least one implementation, the intra prediction unit 22221 may compare the orientations of the MPMs with the orientations of the directional modes, and determine the removable region based on the comparison between the orientations of the MPMs and the orientations of the directional modes. In one implementation, a specific one of the intra prediction regions may be determined as the removable region, when the specific intra prediction region do not include the MPMs of the block unit.

In at least one implementation, the intra prediction unit 22221 may determine which of the neighboring blocks has not been reconstructed during reconstructing the block unit, when the intra prediction unit 22221 determines the removable region based on the prediction information of the neighboring blocks. In at least one implementation, the intra prediction unit 22221 may further determine which of the intra mode directs from the block unit to the determined neighboring blocks, and which of the intra prediction regions includes the determined intra modes. In at least one implementation, the determined intra prediction region may be determined as the removable region.

At block 533, the intra prediction unit 22221 sets at least one of the intra modes included in the removable region as the selected at least one of the intra modes.

In at least one implementation, the intra prediction unit 22221 may check which of the intra modes are included in the removable region, and set the intra modes included in the removable region as a plurality of removable modes. In at least one implementation, the intra prediction unit 22221 may set at least one of the removable modes as the selected at least one of the intra modes for removing from the mode list. In at least one implementation, the selected at least one of the intra modes generated from the removable region may be predefined in the destination device 12 and the source device 11.

In at least one implementation, the block unit is partitioned by at least one of a quad-tree partition method and a binary-tree partition method, when the decoder module 222 decodes the bitstream in HEVC, VTM or other video coding standards. Thus, a quotient obtained by dividing the block width by the block height may be greater than or equal to 2, when the block width is longer than the block height. In addition, the quotient may be less than or equal to ½, when the block width is shorter than the block height.

In at least one implementation, the intra modes included in the first specific intra prediction regions are sets as the selected at least one of the intra modes, when the quotient obtained by dividing the block width by the block height may be greater than or equal to 2. In at least one implementation, the intra modes included in the second specific intra prediction regions are sets as the selected at least one of the intra modes, when the quotient obtained by dividing the block width by the block height may be less than or equal to ½.

Figure 7:
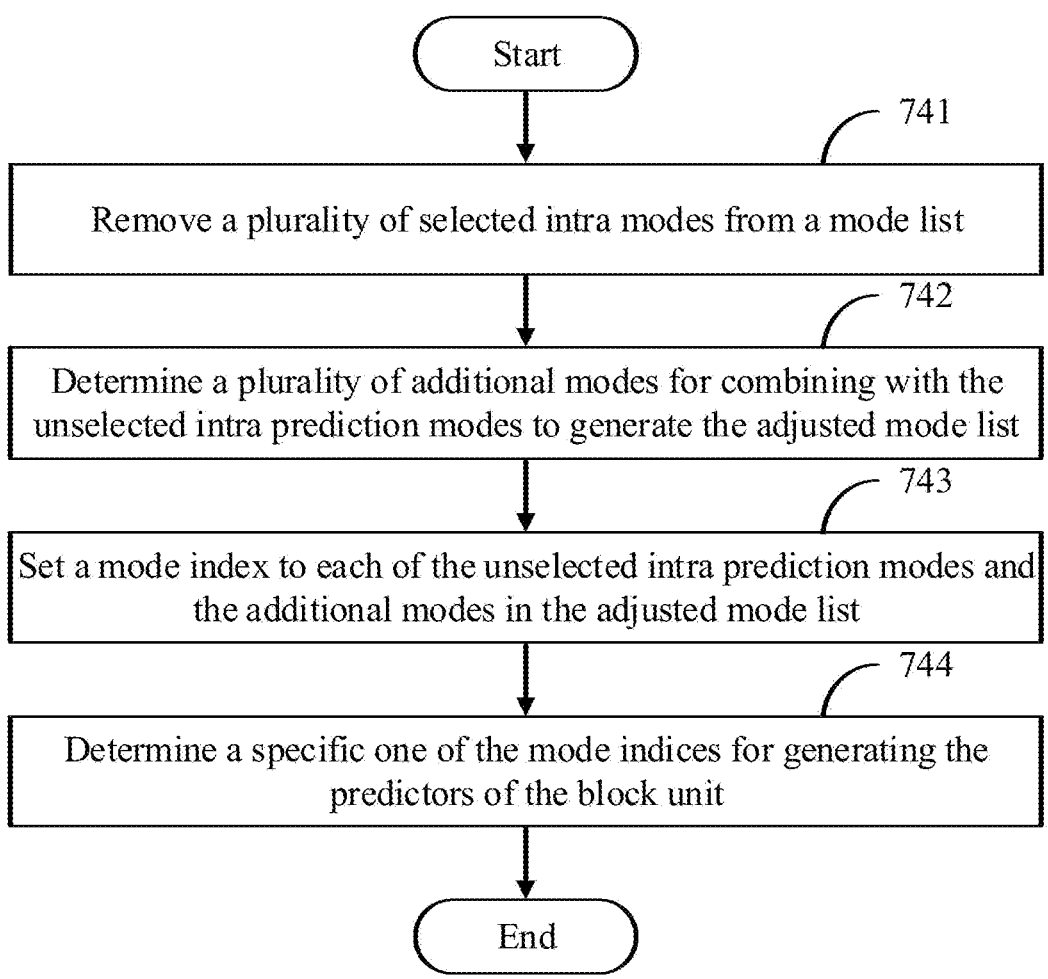
FIG. 7 illustrates a flowchart in accordance with a fourth exemplary implementation of the mode list adjustment for intra prediction.

FIG. 7 illustrates a flowchart in accordance with a fourth exemplary implementation of the mode list adjustment for intra prediction. The example method is provided by way of example, as there are a variety of ways to carry out the method. The method described below may be carried out using the configuration illustrated in FIG. 1 and FIG. 2, for example, and various elements of these figures are referenced in explaining the example method. Each block shown in FIG. 7 represents one or more processes, methods, or subroutines, carried out in the example method. Furthermore, the order of blocks is illustrative only and may change. Additional blocks may be added, or less blocks may be utilized without departing from this disclosure. In at least one implementation, FIG. 7 may be a detailed exemplary implementation of block 34 in FIG. 3 and/or block 44 in FIG. 4.

At block 741, the intra prediction unit 22221 removes a plurality of selected intra modes from a mode list.

In at least one implementation, the intra prediction unit 22221 may select at least one of the intra modes based on one of a block size of a block unit and prediction information of neighboring blocks. In one implementation, the intra prediction unit 22221 may compare the block size with a predefined size, and determine the selected intra modes based on the comparison between the block size and the predefined size. In one implementation, the intra prediction unit 22221 may compare a block width of the block size with a block height of the block size, and determine the selected intra modes based on the comparison between the block width and the block height. In one implementation, the intra prediction unit 22221 may determine a plurality of MPMs from the mode list, compare orientations of the MPMs with the orientations of directional modes included in the intra modes, and determine the selected intra modes based on the comparison between the orientations of the MPMs and the orientations of the directional modes. In one implementation, the intra prediction unit 22221 may determine which of the neighboring blocks has not been reconstructed, determine which of the intra modes directs from the block unit to the determined neighboring blocks, and set the determined intra modes as the selected intra modes.

In at least one implementation, the intra prediction unit 22221 may remove the selected intra modes from the mode list. In at least one implementation, the unselected intra modes are the remaining intra modes in the mode list, when the intra prediction unit 22221 removes all of the selected intra modes from the mode list.

At block 742, the intra prediction unit 22221 determines a plurality of additional modes for combining with the unselected intra modes to generate the adjusted mode list.

In at least one implementation, the intra prediction unit 22221 determines the additional modes based on a block size of a block unit. In at least one implementation, the intra prediction unit 22221 determines the additional modes based on prediction information of the neighboring blocks. In at least one implementation, the number of the removed modes is equal to the number of the additional modes. Thus, the number of the intra modes in the mode list is equal to the number of the additional modes and the remaining intra modes in the adjusted list.

In at least one implementation, the intra prediction unit 22221 may determine the additional modes based on the comparison between the block size and the predefined size. In one implementation, the additional modes may be a plurality of first replaced modes, when the block size is larger than the predefined size. In another implementation, the additional modes may be a plurality of second replaced modes, when the block size is smaller than the predefined size. In the implementation, each of the second replaced modes may be different from the first replaced modes.

In at least one implementation, the intra prediction unit 22221 may determine the additional modes based on the comparison between the block width and the predefined height. In one implementation, the additional modes may be a plurality of third replaced modes, when the block width is longer than the block height. In another implementation, the additional modes may be a plurality of fourth replaced modes, when the block width is shorter than the block height. In the implementation, each of the third replaced modes may be different from the fourth replaced modes.

In at least one implementation, the intra prediction unit 22221 may determine the additional modes based on the comparison between the orientations of the MPMs and the orientations of the directional modes. In one implementation, a new directional mode close to the MPMs mode may be created.

In at least one implementation, the intra prediction unit 22221 may determine which of the neighboring blocks has not been reconstructed, and determine which of the intra modes directs from the block unit to the determined neighboring blocks. In the implementation, the intra prediction unit 22221 may determine the additional modes based on the comparison between the orientations of the determined intra modes and the orientations of the directional modes. In one implementation, a new directional mode far from the determined intra modes may be created.

In at least one implementation, each of the intra modes has a first intra prediction index. In one implementation, the first intra prediction indices of the intra modes may be equal to 0 to 34, when the decoder module 222 decodes the bitstream in HEVC. In the implementation, the first intra prediction indices of the planer modes and the DC mode may be equal to 0 and 1, and the first intra prediction indices of the directional modes may be equal to 2 to 33. In one implementation, the first intra prediction indices of the intra modes may be equal to 0 to 66, when the decoder module 222 decodes the bitstream in VTM. In the implementation, the first intra prediction indices of the planer modes and the DC mode may be equal to 0 and 1, and the first intra prediction indices of the directional modes may be equal to 2 to 66.

In the at least one implementation, the intra prediction unit 22221 may divide the directional modes into a plurality of intra prediction regions. In the implementation, the number of the intra prediction regions may be predefined in the destination device 12 and the source device 11. For example, the number of the intra prediction regions may be equal to 4, 6, or 13. In one implementation, in FIG. 6C, the first one of the intra prediction regions 641-646 may include the intra modes having the first intra prediction indices 2 to 11, the last one of the intra prediction regions 641-646 may include the intra modes having the first intra prediction indices 57 to 66, and the others of the intra prediction regions 641-646 may include the intra modes having the first intra prediction indices 12 to 56.

In at least one implementation, the intra prediction unit 22221 may determine an inserted region based on the comparison between the block size and the predefined size, and generate the additional modes based on the inserted region. In one implementation, the inserted region may be predefined to include at least one of the first intra prediction region 641 and the last intra prediction region 646, when the block size is smaller than the predefined size. In another implementation, the inserted region may be predefined to include at least one of the second intra prediction region 642 to the fifth intra prediction region 645, when the block size is larger than the predefined size.

Figure 8:
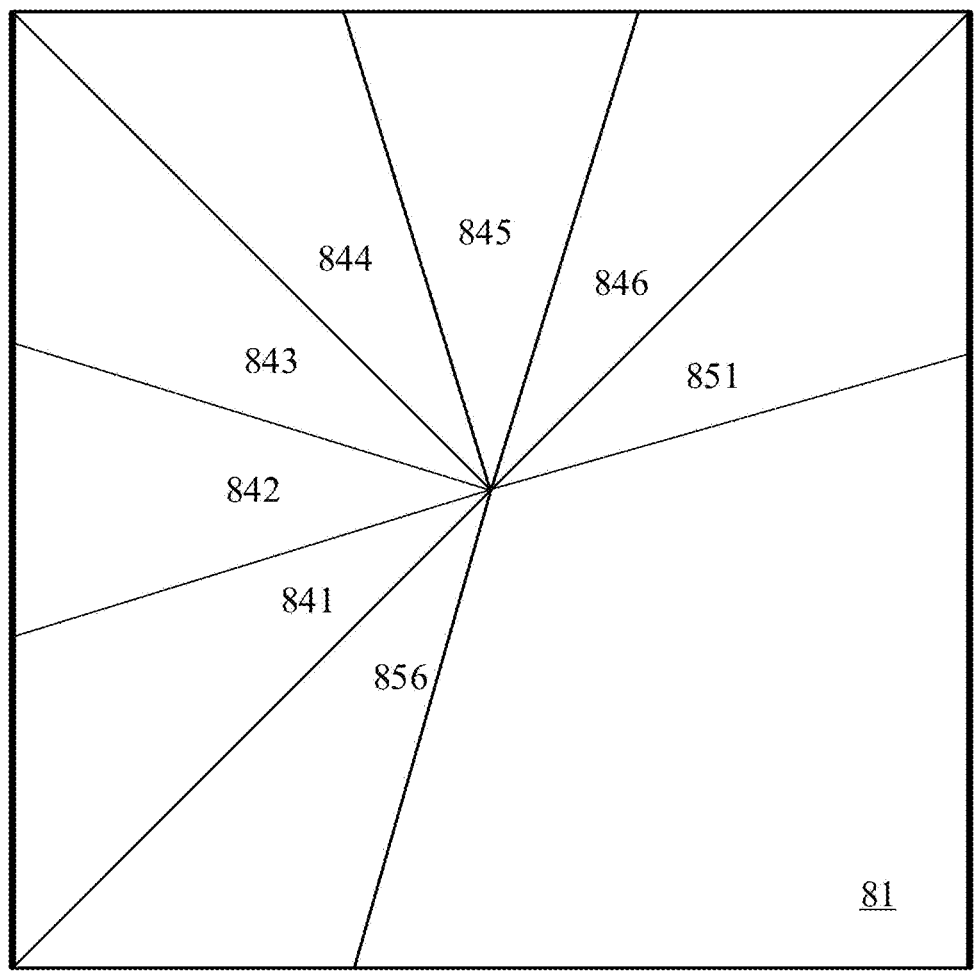
FIG. 8 is a schematic illustration of an exemplary implementation of six intra prediction regions and two replaced regions of the block unit.

In at least one implementation, the intra prediction unit 22221 may determine the inserted region based on the comparison between the block width and the block height and generate the additional modes based on the inserted region. In one implementation, the inserted region may be predefined based on at least one of the first intra prediction region 641 to the third intra prediction region 643, when the block width is shorter than the block height. In another implementation, the inserted region may be predefined based on at least one of the fourth intra prediction region 644 to the sixth intra prediction region 646, when the block width is longer than the block height. For example, the inserted region may be predefined based on the first intra prediction region 641, when the block width is shorter than the block height. In addition, the inserted region may be predefined based on the sixth intra prediction region 646, when the block width is longer than the block height. In at least one implementation, a first replaced region neighboring with the first intra prediction region 641 may be predefined as the inserted region, when the block width is shorter than the block height. In addition, a first replaced region neighboring with the sixth intra prediction region 646 may be predefined as the inserted region, when the block width is longer than the block height. In the implementation, the second replaced region is different from the first replaced region. FIG. 8 is a schematic illustration of an exemplary implementation of six intra prediction regions 841-846 and two replaced regions 851 and 856 of the block unit 81. In at least one implementation, the third replaced modes may be created in the replaced region 856, when the block width is longer than the block height. In addition, the fourth replaced modes may be created in the replaced region 851, when the block width is shorter than the block height.

In at least one implementation, the intra prediction unit 22221 may determine the inserted region based on the comparison between the orientations of the MPMs and the orientations of the directional modes and generate the additional modes based on the inserted region. In one implementation, the inserted region may be set to include a specific one of the intra prediction regions 641-646, when the specific intra prediction region includes most of the MPMs of the block unit.

In at least one implementation, the intra prediction unit 22221 may determine which of the neighboring blocks has not been reconstructed, and determine which of the intra modes directs from the block unit to the determined neighboring blocks. In the implementation, the intra prediction unit 22221 may further determine which of the intra prediction regions includes the determined intra modes. In one implementation, the inserted region may be different from the determined intra prediction regions. For example, the neighboring blocks in the left of the block unit 81 are not decoded, when the block unit 81 is being decoded. In the implementation, the orientation of the determined intra modes directing from the block unit to the neighboring blocks may be similar to a horizontal orientation. Thus, the inserted region far from the horizontal orientation may be the replaced region 851. In other implementation, the inserted region far from a vertical orientation may be the replaced region 856, when the orientation of the determined intra modes directing from the block unit to the neighboring blocks may be similar to the vertical orientation.

At block 743, the intra prediction unit 22221 sets a mode index to each of the unselected intra modes and the additional modes in the adjusted mode list.

In at least one implementation, each of the intra modes has the first intra prediction index. In at least one implementation, the intra modes may include N non-directional modes having the first intra prediction indices set from 0 to N−1, and M directional modes having the first intra prediction indices set from N to (N−1)+M.

In at least one implementation, the intra modes may include two non-directional modes having the first intra prediction indices set as zero and one, and 32 directional modes having the first intra prediction indices as 2 to 33, when N is equal to 2 and M is equal to 32 in HEVC. In at least one implementation, the intra modes may include two non-directional modes having the first intra prediction indices set as zero and one, and 65 directional modes having the first intra prediction indices as 2 to 66, when N is equal to 2 and M is equal to 65 in VTM.

In at least one implementation, the intra prediction unit 22221 may remain the first intra prediction indices of the unselected intra modes unchanged. Thus, the mode index of the unselected intra modes may be identical to the first intra prediction indices of the unselected intra modes. In one implementation, the mode index of the unselected intra modes may be equal to 12-66, when the selected intra prediction modes having the first intra prediction indices 2-11 are removed.

In at least one implementation, a plurality of second intra prediction indices may be set from N+M to (N+M−1)+K for the additional modes, when the number of the additional modes is equal to K. In one implementation, the second intra prediction indices may be set from N+32 to N+K+31, when M is equal to 32 in HEVC. In one implementation, the second intra prediction indices may be set from N+65 to N+K+64, when M is equal to 65 in VTM. For example, the number of the additional modes K may be equal to 10, when the selected intra prediction modes having the first intra prediction indices 2-11 are removed. Thus, the second intra prediction indices of the additional modes may be equal to 67-76, when N is equal to 2 and M is equal to 65 in VTM.

In at least one implementation, the first intra prediction index of a R-th one of the directional modes is equal to (N−1)+R, since the first intra prediction indices of the M directional modes are set from N to (N−1)+M. In one implementation, the first intra prediction index of the R-th directional mode is equal to R+1, when N is equal to 2 in VTM. In at least one implementation, the second intra prediction index of a Q-th one of the directional modes is equal to (N+M−1)+Q, since the plurality of second intra prediction indices may be set from N+M to (N+M−1)+K for the additional modes. In one implementation, the second intra prediction index of the Q-th additional mode is equal to 65+(Q+1), when N is equal to 2 and M is equal to 65 in VTM.

At block 744, the intra prediction unit 22221 determines a specific one of the mode indices for generating the predictors of the block unit.

In at least one implementation, the intra prediction unit 22221 may receive a prediction indication indicating the specific mode index, when the block unit is predicted based on a specific one of the unselected intra modes and the additional modes corresponding to the specific mode index in the adjusted list. In one implementation, the intra prediction unit 22221 may determine, along the orientation of the specific mode, one of the predictors from the reference samples generated based on the neighboring blocks neighboring with the block unit for each of the block elements.

In at least one implementation, the specific mode index may be greater than or equal to 0 and less than N+M, when the specific mode index indicated by the prediction indication is identical to one of the first intra prediction indices of the unselected intra modes. In at least one implementation, and the specific mode index is greater than or equal to N+M, when the specific mode index is different from the first intra prediction indices of the unselected intra modes.

Figure 9A:
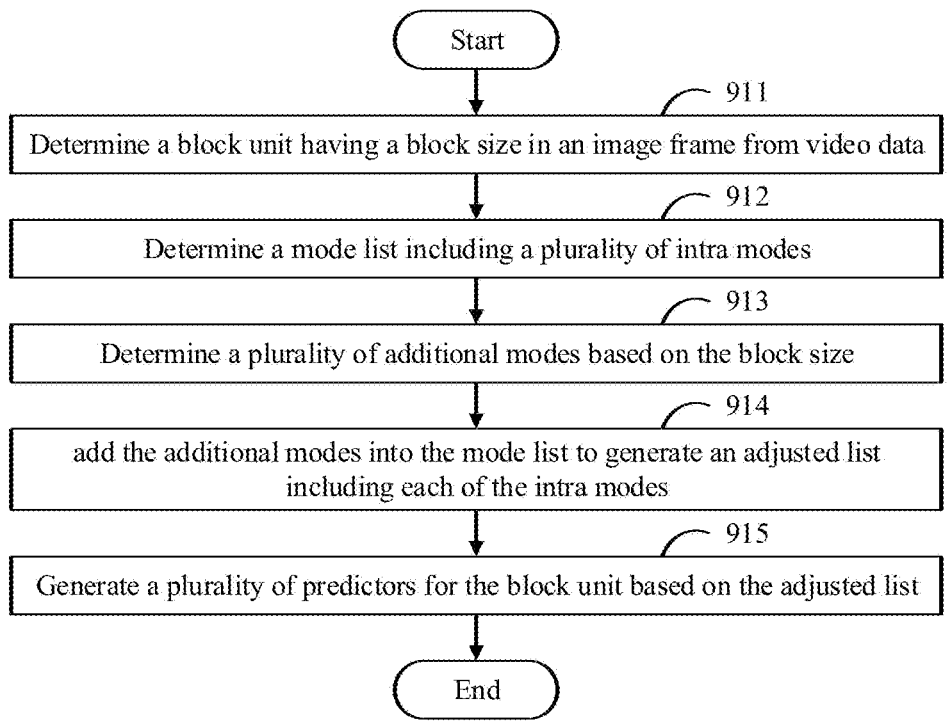
FIGS. 9A and 9B illustrate flowcharts in accordance with a fifth and a sixth exemplary implementations of the mode list adjustment for intra prediction.

FIG. 9A illustrates a flowchart in accordance with a fifth exemplary implementation of the mode list adjustment for intra prediction. The example method is provided by way of example only, as there are a variety of ways to carry out the method. The method described below may be carried out using the configuration illustrated in FIG. 1 and FIG. 2, for example, and various elements of these figures are referenced in explaining the example method. Each block shown in FIG. 9A represents one or more processes, methods, or subroutines, carried out in the example method. Furthermore, the order of blocks is illustrative only and may change. Additional blocks may be added or less blocks may be utilized without departing from this disclosure.

At block 911, the decoder module 222 determines a block unit having a block size in an image frame from video data.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indication in the bitstream. For example, the decoder module 222 may divide the image frames to generate a plurality of coding tree units, and further divide one of the coding tree units to determine the block unit having the block size according to the partition indications based on any video coding standard. In at least one implementation, the block size may include a block height and a block width.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

At block 912, the intra prediction unit 22221 determines a mode list including a plurality of intra modes.

In at least one implementation, the intra modes in the mode list may be predefined in the destination device 12 and the source device 11. For example, the intra modes may be predefined as a planar mode, a DC mode, and a plurality of directional modes. In at least one implementation, the number of directional modes may be equal to 33, when the decoder module 222 decodes the bitstream in HEVC. In at least one implementation, the number of directional modes may be equal to 65, when the decoder module 222 decodes the bitstream in VTM.

In at least one implementation, each of the intra modes has a first intra prediction index. In one implementation, the first intra prediction indices of the intra modes may be equal to 0 to 34, when the decoder module 222 decodes the bitstream in HEVC. In the implementation, the first intra prediction indices of the planer modes and the DC mode may be equal to 0 and 1, and the first intra prediction indices of the directional modes may be equal to 2 to 33. In one implementation, the first intra prediction indices of the intra modes may be equal to 0 to 66, when the decoder module 222 decodes the bitstream in VTM. In the implementation, the first intra prediction indices of the planer modes and the DC mode may be equal to 0 and 1, and the first intra prediction indices of the directional modes may be equal to 2 to 66.

At block 913, the intra prediction unit 22221 determines a plurality of additional modes based on the block size.

In at least one implementation, the intra prediction unit 22221 may compare the block size with a predefined size, and determine the additional modes based on the comparison between the block size and the predefined size. In one implementation, the additional modes may be a plurality of first added modes, when the block size is larger than the predefined size. In another implementation, the additional modes may be a plurality of second added modes, when the block size is smaller than the predefined size. In the implementation, each of the second added modes may be different from the first added modes.

In one implementation, the intra prediction unit 22221 may compare a block width of the block unit with a block height of the block unit, and determine the additional modes based on the comparison between the block width and the block height. In one implementation, the additional modes may be a plurality of third added modes, when the block width is longer than the block height. In another implementation, the additional modes may be a plurality of fourth added modes, when the block width is shorter than the block height. In the implementation, each of the third added modes may be different from the fourth added modes.

In at least one implementation, the intra prediction unit 22221 may divide a plurality of intra modes into a plurality of intra prediction regions. In the at least one implementation, the intra prediction unit 22221 may divide the directional modes into the intra prediction regions. In one implementation, in FIG. 6C, the first one of the intra prediction regions 641-646 may include the intra modes having the intra prediction indices 2 to 11, the last one of the intra prediction regions 641-646 may include the intra modes having the intra prediction indices 57 to 66, and the others of the intra prediction regions 641-646 may include the intra modes having the intra prediction indices 12 to 56.

In at least one implementation, the intra prediction unit 22221 may determine an inserted region based on the comparison between the block size and the predefined size, and generate the additional modes based on the inserted region. In one implementation, the inserted region may be predefined to include at least one of the first intra prediction region 641 and the last intra prediction region 646, when the block size is smaller than the predefined size. In another implementation, the inserted region may be predefined to include at least one of the second intra prediction region 642 to the fifth intra prediction region 645, when the block size is larger than the predefined size.

In at least one implementation, the intra prediction unit 22221 may determine the inserted region based on the comparison between the block width and the block height and generate the additional modes in the inserted region. In one implementation, the inserted region may be predefined based on at least one of the first intra prediction region 641 to the third intra prediction region 643, when the block width is shorter than the block height. In another implementation, the inserted region may be predefined based on at least one of the fourth intra prediction region 644 to the sixth intra prediction region 646, when the block width is longer than the block height. For example, the inserted region may be predefined based on the first intra prediction region 641, when the block width is shorter than the block height. In addition, the inserted region may be predefined based on the sixth intra prediction region 646, when the block width is longer than the block height. In at least one implementation, a first added region neighboring with the first intra prediction region 641 may be predefined as the inserted region, when the block width is shorter than the block height. In addition, a second added region neighboring with the sixth intra prediction region 646 may be predefined as the inserted region, when the block width is longer than the block height. In the implementation, the second added region is different from the first added region. In at least one implementation, in FIG. 8, the third added modes may be created in the added region 856, when the block width is longer than the block height. In addition, the fourth added modes may be created in the added region 851, when the block width is shorter than the block height.

At block 914, the intra prediction unit 22221 adds the additional modes into the mode list to generate an adjusted list including each of the intra modes.

In at least one implementation, the intra prediction unit 22221 may set a second intra prediction index for each of the additional modes, when the additional modes are added into the mode list. In at least one implementation, each of the intra modes has the first intra prediction index. In at least one implementation, the intra modes may include N non-directional modes having the first intra prediction indices set from 0 to N−1, and M directional modes having the first intra prediction indices set from N to N+M−1.

In at least one implementation, the intra modes may include two non-directional modes having the first intra prediction indices set as zero and one, and 32 directional modes having the first intra prediction indices as 2 to 33, when N is equal to 2 and M is equal to 32 in HEVC. In at least one implementation, the intra modes may include two non-directional modes having the first intra prediction indices set as zero and one, and 65 directional modes having the first intra prediction indices as 2 to 66, when N is equal to 2 and M is equal to 65 in VTM.

In at least one implementation, the second intra prediction indices may be set from N+M to N+M+K, when the number of the additional modes is equal to K. In one implementation, the second intra prediction indices may be set from N+32 to N+K+32, when M is equal to 32 in HEVC. In one implementation, the second intra prediction indices may be set from N+65 to N+K+64, when M is equal to 65 in VTM. For example, the number of the additional modes K may be equal to 10, when the selected intra prediction modes having the first intra prediction indices 2-11 are removed. Thus, the second intra prediction indices of the additional modes may be equal to 67-76, when N is equal to 2 and M is equal to 65 in VTM.

At block 915, the intra prediction unit 22221 generates a plurality of predictors for the block unit based on the adjusted list.

In at least one implementation, the intra prediction unit 22221 may determine the prediction indications from the bitstream. In at least one implementation, the intra prediction unit 22221 may determine, based on a specific one of the prediction indications, one of the intra modes and the additional modes in the adjusted list derived according to the block size. In at least one implementation, the specific prediction indication indicates a mode index identical to the second intra prediction index of the determined mode. Thus, the intra prediction unit 22221 may derive the determined mode based on the mode index. In at least one implementation, the mode index indicated by the specific prediction indication may be identical to the first intra prediction index of the determined mode.

In at least one implementation, the block unit may include a plurality of block elements. In the implementation, each of the block elements may be a pixel element. In at least one implementation, the intra prediction unit 22221 may determine, along an orientation of the determined mode derived for the block unit, one of the predictors based on a plurality of neighboring blocks neighboring with the block unit for each of the block elements. In one implementation, the determined mode may be the determined one of the intra modes and the additional modes in the adjusted list derived according to the block size.

In at least one implementation, the first summer 2224 of the decoder module 222 in the destination device 12 may add the predictors derived based on the determined mode into a plurality of residual samples determined from the bitstream to reconstruct the block unit. In addition, the decoder module 222 may reconstruct all of the other block units in the image frame for reconstructing the image frame and the video.

Figure 9B:
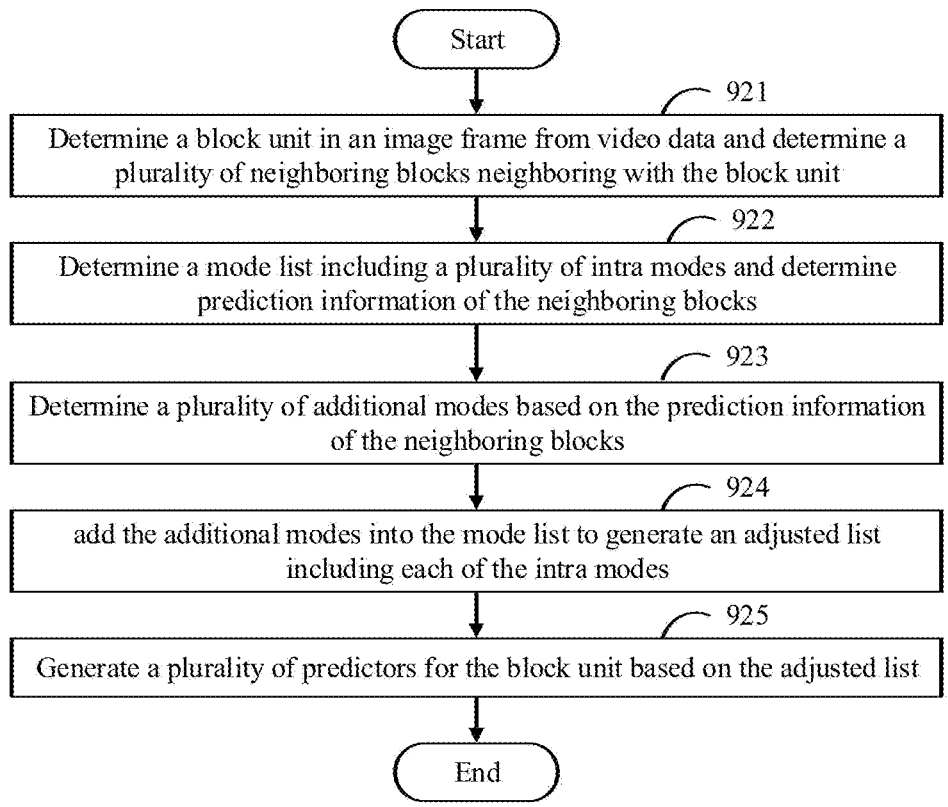

FIG. 9B illustrates a flowchart in accordance with a sixth exemplary implementation of the mode list adjustment for intra prediction. The example method is provided by way of example only, as there are a variety of ways to carry out the method. The method described below may be carried out using the configuration illustrated in FIG. 1 and FIG. 2, for example, and various elements of these figures are referenced in explaining the example method. Each block shown in FIG. 9B represents one or more processes, methods, or subroutines, carried out in the example method. Furthermore, the order of blocks is illustrative only and may change. Additional blocks may be added or less blocks may be utilized without departing from this disclosure.

At block 921, the decoder module 222 determines a block unit in an image frame from video data, and determines a plurality of neighboring blocks neighboring with the block unit.

In at least one implementation, the video data may be a bitstream. The destination device 12 may receive the bitstream from an encoder, such as the source device 11, via the second interface 123 of the destination device 12. The second interface 123 provides the bitstream to the decoder module 222. The decoder module 222 determines the image frame based on the bitstream, and divides the image frame to determine the block unit according to a plurality of partition indication in the bitstream. For example, the decoder module 222 may divide the image frames to generate a plurality of coding tree units, and further divide one of the coding tree units to determine the block unit having the block size according to the partition indications based on any video coding standard.

In at least one implementation, the entropy decoding unit 2221 may decode the bitstream to determine a plurality of prediction indications for the block unit, and then the decoder module 222 may further reconstruct the block unit based on the prediction indications. In at least one implementation, the prediction indications may include a plurality of flags and a plurality of indices.

In at least one implementation, prediction process unit 2222 of the destination device 12 determines the neighboring blocks neighboring with the block unit. In the implementation, the neighboring blocks may be included in a plurality of reference lines. In the implementation, the neighboring blocks in a first one of the reference lines is adjacent to the block unit, and the neighboring blocks in a second one of the reference lines is adjacent to the neighboring blocks in the first reference line. In at least one implementation, the neighboring blocks may be reconstructed prior to reconstructing the block unit, so the neighboring blocks may be a plurality of reference candidates for reconstructing the block unit. In at least one implementation, the block unit may be reconstructed prior to reconstructing some of the neighboring blocks, so the intra prediction unit 22221 may generate the reference samples of the block unit for the unreconstructed neighboring blocks by padding with the reconstructed neighboring blocks.

At block 922, the intra prediction unit 22221 determines a mode list including a plurality of intra modes, and determines prediction information of the neighboring blocks.

In at least one implementation, the intra modes in the mode list may be predefined in the destination device 12 and the source device 11. For example, the intra modes may be predefined as a planar mode, a DC mode, and a plurality of directional modes. In at least one implementation, the number of directional modes may be equal to 33, when the decoder module 222 decodes the bitstream in HEVC. In at least one implementation, the number of directional modes may be equal to 65, when the decoder module 222 decodes the bitstream in VTM.

In at least one implementation, each of the intra modes has a first intra prediction index. In one implementation, the first intra prediction indices of the intra modes may be equal to 0 to 34, when the decoder module 222 decodes the bitstream in HEVC. In the implementation, the first intra prediction indices of the planer modes and the DC mode may be equal to 0 and 1, and the first intra prediction indices of the directional modes may be equal to 2 to 33. In one implementation, the first intra prediction indices of the intra modes may be equal to 0 to 66, when the decoder module 222 decodes the bitstream in VTM. In the implementation, the first intra prediction indices of the planer modes and the DC mode may be equal to 0 and 1, and the first intra prediction indices of the directional modes may be equal to 2 to 66.

In at least one implementation, the prediction information of the neighboring blocks may include a plurality of decoded modes of the neighboring blocks. In one implementation, the prediction information may further include a plurality of prediction modes of the neighboring blocks, when the decoded modes of the neighboring blocks are intra prediction. In the implementation, the prediction modes are selected from the intra modes in the mode list for reconstructing the neighboring block. In at least one implementation, the intra prediction unit 22221 may check the prediction modes of the neighboring blocks, and determine a plurality of most probable modes (MPMs) based on the prediction modes of the neighboring blocks for the block unit. In one implementation, the intra prediction unit 22221 may bypass a specific one of the neighboring blocks and check the decoded mode of the other neighboring blocks, when the decoded mode of the specific neighboring blocks is the inter prediction.

In at least one implementation, the prediction information of the neighboring blocks may be any information used to determine whether the neighboring blocks are reconstructed. For example, the intra prediction unit 22221 may directly receive a plurality of reconstructed components of the neighboring blocks generated by the first summer 2224. When the intra prediction unit 22221 receives the reconstructed components of the neighboring blocks, the intra prediction unit 22221 may determine that the neighboring blocks are reconstructed prior to reconstructing the block unit. When the intra prediction unit 22221 does not receive the reconstructed components of the neighboring blocks, the intra prediction unit 22221 may determine that the neighboring blocks are not reconstructed prior to reconstructing the block unit. In one implementation, the reconstructed components of the neighboring blocks may be used to generate a plurality of reference samples of the block unit, when all of the neighboring blocks have been reconstructed prior to reconstructing the block unit. In other implementations, a specific one of the neighboring blocks may not be used to generate the reference samples, when the specific neighboring block has not been reconstructed during reconstructing the block unit. In the implementation, the intra prediction unit 22221 may generate a specific one of the reference samples corresponding to the specific neighboring block by padding with the other neighboring blocks.

At block 923, the intra prediction unit 22221 determines a plurality of additional modes based on the prediction information of the neighboring blocks.

In at least one implementation, each of the intra modes including the MPMs and the directional modes include an orientation. In at least one implementation, the intra prediction unit 22221 may compare the orientations of the MPMs with the orientations of the directional mode. In at least one implementation, the intra prediction unit 22221 may determine the additional modes based on the comparison between the orientations of the MPMs and the orientations of the directional modes. In one implementation, a new directional mode close to the MPMs mode may be created.

In at least one implementation, the intra prediction unit 22221 may determine which of the neighboring blocks has not been reconstructed, and determine which of the intra modes directs from the block unit to the determined neighboring blocks. In the implementation, the intra prediction unit 22221 may determine the additional modes based on the comparison between the orientations of the determined intra modes and the orientations of the directional modes. In one implementation, a new directional mode far from the determined intra modes may be created.

In the at least one implementation, the intra prediction unit 22221 may divide the directional modes into a plurality of intra prediction regions. In the implementation, the number of the intra prediction regions may be predefined in the destination device 12 and the source device 11. For example, the number of the intra prediction regions may be equal to 4, 6, or 13. In one implementation, in FIG. 6C, the first one of the intra prediction regions 641-646 may include the intra modes having the intra prediction indices 2 to 11, the last one of the intra prediction regions 641-646 may include the intra modes having the intra prediction indices 57 to 66, and the others of the intra prediction regions 641-646 may include the intra modes having the intra prediction indices 12 to 56.

In at least one implementation, the intra prediction unit 22221 may determine an inserted region based on the comparison between the orientations of the MPMs and the orientations of the directional modes and generate the additional modes based on the inserted region. In one implementation, the inserted region may be set to include a specific one of the intra prediction regions 641-646, when the specific intra prediction region includes most of the MPMs of the block unit.

In at least one implementation, the intra prediction unit 22221 may determine which of the neighboring blocks has not been reconstructed, and determine which of the intra modes directs from the block unit to the determined neighboring blocks. In the implementation, the intra prediction unit 22221 may further determine which of the intra prediction regions includes the determined intra modes. In one implementation, the inserted region may be different from the determined intra prediction regions. In another implementation, the inserted region may be far from the determined intra prediction regions. For example, the neighboring blocks in the left of the block unit 81 are not decoded, when the block unit 81 is being decoded. In the implementation, the orientation of the determined intra modes directing from the block unit to the neighboring blocks may be similar to a horizontal orientation. Thus, the inserted region far from the horizontal orientation may be a first added region 851 in FIG. 8. In other implementation, the inserted region far from a vertical orientation may be a second added region 856, when the orientation of the determined intra modes directing from the block unit to the neighboring blocks may be similar to the vertical orientation.

At block 924, the intra prediction unit 22221 adds the additional modes into the mode list to generate an adjusted list including each of the intra modes.

In at least one implementation, the intra prediction unit 22221 may set a second intra prediction index for each of the additional modes, when the additional modes are added into the mode list. In at least one implementation, each of the intra modes has the first intra prediction index. In at least one implementation, the intra modes may include N non-directional modes having the first intra prediction indices set from 0 to N−1, and M directional modes having the first intra prediction indices set from N to N+M−1.

In at least one implementation, the intra modes may include two non-directional modes having the first intra prediction indices set as zero and one, and 32 directional modes having the first intra prediction indices as 2 to 33, when N is equal to 2 and M is equal to 32 in HEVC. In at least one implementation, the intra modes may include two non-directional modes having the first intra prediction indices set as zero and one, and 65 directional modes having the first intra prediction indices as 2 to 66, when N is equal to 2 and M is equal to 65 in VTM.

In at least one implementation, the second intra prediction indices may be set from N+M to N+M+K, when the number of the additional modes is equal to K. In one implementation, the second intra prediction indices may be set from N+32 to N+K+32, when M is equal to 32 in HEVC. In one implementation, the second intra prediction indices may be set from N+65 to N+K+64, when M is equal to 65 in VTM. For example, the number of the additional modes K is equal to 10, when the selected intra prediction modes having the first intra prediction indices 2-11 are removed. Thus, the second intra prediction indices of the additional modes may be equal to 67-76.

At block 925, the intra prediction unit 22221 generates a plurality of predictors for the block unit based on the adjusted list.

In at least one implementation, the intra prediction unit 22221 may determine the prediction indications from the bitstream. In one implementation, the intra prediction unit 22221 may determine, based on a specific one of the prediction indications, one of the intra modes and the additional modes in the adjusted list derived according to the prediction information of the neighboring blocks. In at least one implementation, the specific prediction indication indicates a mode index identical to the second intra prediction index of the determined mode. Thus, the intra prediction unit 22221 may derive the determined mode based on the mode index. In at least one implementation, the mode index indicated by the specific prediction indication may be identical to the first intra prediction index of the determined mode.

In at least one implementation, the block unit may include a plurality of block elements. In the implementation, each of the block elements may be a pixel element. In at least one implementation, the intra prediction unit 22221 may determine, along a specific one of the orientations of the determined mode derived for the block unit, one of the predictors based on the neighboring blocks neighboring with the block unit for each of the block elements. In one implementation, the determined mode may be the determined one of the intra modes and the additional modes in the adjusted list derived according to the prediction information of the neighboring blocks.

In at least one implementation, the first summer 2224 of the decoder module 222 in the destination device 12 may add the predictors derived based on the determined mode into a plurality of residual samples determined from the bitstream to reconstruct the block unit. In addition, the decoder module 222 may reconstruct all of the other block units in the image frame for reconstructing the image frame and the video.

Figure 10:
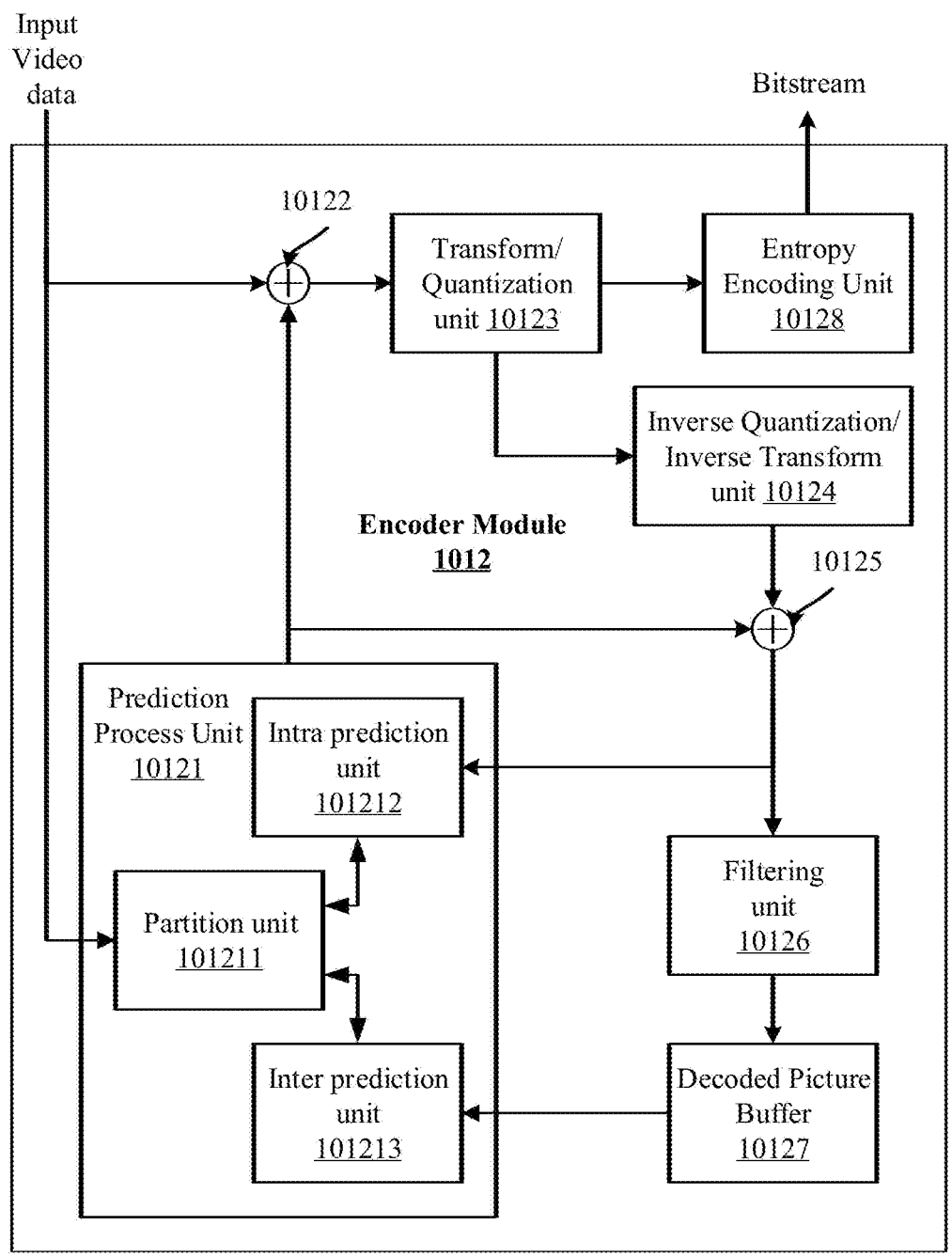
FIG. 10 is a block diagram of an exemplary implementation of the encoder module of the source device in the system of FIG. 1.

FIG. 10 is a block diagram of an encoder module 1012 representing an exemplary implementation of the encoder module 1012 of the source device 11 in the system of FIG. 1. In at least one implementation, the encoder module 1012 includes a prediction process unit 10121, a first summer 10122, a transform/quantization unit 10123, an inverse quantization/inverse transform unit 10124, a second summer 10125, a filtering unit 10126, a decoded picture buffer 10127, and an entropy encoding unit 10128. In at least one implementation, the prediction process unit 10121 of the encoder module 1012 further includes a partition unit 101211, an intra prediction unit 101212, and an inter prediction unit 101213. In at least one implementation, the encoder module 1012 receives the source video, and encodes the source video to output a bitstream.

In at least one implementation, the encoder module 1012 may receive a source video including a plurality of image frames, and then divide the image frames according to a coding structure. In at least one implementation, each of the image frames may be divided into at least one image block. The at least one image block may include a luminance block having a plurality of luminance samples, and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit. In at least one implementation, the encoder module 1012 may perform additional sub-divisions of the source video. It should be noted that the disclosure described herein are generally applicable to video coding, regardless of how the source video is partitioned prior to and/or during encoding.

In at least one implementation, during the encoding process, the prediction process unit 10121 receives a current image block of a specific one of the image frames. The current image block may be one of the luminance block and the at least one of the chrominance block in the specific image frame. The partition unit 101211 divides the current image block into multiple block units. The intra prediction unit 101212 may perform intra-predictive coding of a current block unit relative to one or more neighboring blocks in the same frame as the current block unit to provide spatial prediction. The inter prediction unit 101213 may perform inter-predictive coding of the current block unit relative to one or more blocks in one or more reference image block to provide temporal prediction.

In at least one implementation, the prediction process unit 10121 may select one of the coding results generated by the intra prediction unit 101212 and the inter prediction unit 101213 based on a mode selection method, such as a cost function. In at least one implementation, the mode selection method may be a rate-distortion optimization (RDO) process. The prediction process unit 10121 determines the selected coding result, and provides a predicted block corresponding to the selected coding result to the first summer 10122 for generating a residual block and to the second summer 10125 for reconstructing the encoded block unit. In at least one implementation, the prediction process unit 10121 may further provide syntax elements, such as motion vectors, intra-mode indicators, partition information, and other syntax information, to the entropy encoding unit 10128.

In at least one implementation, the intra prediction unit 101212 may intra-predict the current block unit. In at least one implementation, the intra prediction unit 101212 may determine an intra-prediction mode directing toward reconstructed sample neighboring to the current block unit to encode the current block unit. In at least one implementation, the intra prediction unit 101212 may encode the current block unit using various intra-prediction modes, and the intra prediction unit 101212 or the prediction process unit 10121 may select an appropriate intra-prediction mode from the tested modes. In at least one implementation, the intra prediction unit 101212 may encode the current block unit using a cross component prediction mode to predict one of the two chroma components of the current block unit based on the luma components of the current block unit. In addition, the intra prediction unit 101212 may predict a first one of the two chroma components of the current block unit based on the other of the two chroma components of the current block unit.

In at least one implementation, the inter prediction unit 101213 may inter-predict the current block unit as an alternative to the intra-prediction performed by the intra prediction unit 101212, as described above. The inter prediction unit 101213 may perform a motion estimation to estimate a motion of the current block unit for generating a motion vector. The motion vector may indicate a displacement of the current block unit within the current image block relative to a reference block unit within a reference image block. In at least one implementation, the inter prediction unit 101213 receives at least one reference image block stored in the decoded picture buffer 10127 and estimates the motion based on the received reference image blocks to generate the motion vector.

In at least one implementation, the first summer 10122 generates the residual block by subtracting the prediction block determined by the prediction process unit 10121 from the original current block unit. The first summer 10122 represents the component or components that perform this subtraction operation.

In at least one implementation, the transform/quantization unit 10123 applies a transform to the residual block to generate a residual transform coefficient, and then quantizes the residual transform coefficients to further reduce bit rate. In at least one implementation, the transform may be DCT, DST, AMT, MDNSST, HyGT, signal dependent transform, KLT, wavelet transform, integer transform, sub-band transform or a conceptually similar transform. In at least one implementation, the transform may convert the residual information from a pixel value domain to a transform domain, such as a frequency domain. In at least one implementation, the degree of quantization may be modified by adjusting a quantization parameter. In at least one implementation, the transform/quantization unit 10123 may perform a scan of the matrix including the quantized transform coefficients. Alternatively, the entropy encoding unit 10128 may perform the scan.

In at least one implementation, the entropy encoding unit 10128 may receive a plurality of syntax elements including quantization parameter, transform data, motion vectors, intra modes, partition information, and other syntax information, from the prediction process unit 10121, and the transform/quantization unit 10123, and encode encodes the syntax elements into the bitstream. In at least one implementation, the entropy encoding unit 10128 entropy encodes the quantized transform coefficients. In at least one implementation, the entropy encoding unit 10128 may perform CAVLC, CABAC, SBAC, PIPE coding or another entropy coding technique to generate an encoded bitstream. In at least one implementation, the encoded bitstream may be transmitted to another device (e.g., the destination device 12) or archived for later transmission or retrieval.

In at least one implementation, the inverse quantization/inverse transform unit 10124 may apply inverse quantization and inverse transformation to reconstruct the residual block in the pixel domain for later use as a reference block. In at least one implementation, the second summer 10125 adds the reconstructed residual block to the prediction block provided from the prediction process unit 10121 to produce a reconstructed block for storage in the decoded picture buffer 10127.

In at least one implementation, the filtering unit 10126 may include a deblocking filter, a SAO filter, a bilateral filter, and/or an ALF to remove blockiness artifacts from the reconstructed block. Additional filters (in loop or post loop) may also be used in addition to the deblocking filter, the SAO filter, the bilateral filter and the ALF. Such filters are not shown for brevity, but if desired, may filter the output of the second summer 10125.

In at least one implementation, the decoded picture buffer 10127 may be a reference picture memory that stores the reference block for use in encoding video by the encoder module 1012, e.g., in intra- or inter-coding modes. The decoded picture buffer 10127 may be formed by any of a variety of memory devices, such as DRAM, including SDRAM, MRAM, RRAM), or other types of memory devices. In at least one implementation, the decoded picture buffer 10127 may be on-chip with other components of the encoder module 1012, or off-chip relative to those components.

In at least one implementation, the encoder module 1012 may perform the mode list adjustment method for intra prediction as shown in FIG. 3. The method in FIG. 3 may be carried out using the configuration illustrated in FIG. 1 and FIG. 10, for example, and various elements of these figures are referenced in explaining the example method. Furthermore, the order of blocks in FIG. 3 is illustrative only and may change. Additional blocks may be added or less blocks may be utilized without departing from this disclosure.

At block 31, the encoder module 1012 determines a block unit having a block size in an image frame from video data.

In at least one implementation, the video data may be a video. The source device 11 may receive the video by the source module 111. The encoder module 1012 determines the image frame from the video, and divides the image frame to determine the block unit.

In at least one implementation, the prediction process unit 10121 of the source device 11 determines the block unit from the video via the partition unit 101211, and then the encoder module 1012 provides a plurality of partition indications into a bitstream based on a partition result of the partition unit 101211. In at least one implementation, the block size may include a block height and a block width.

At block 32, the intra prediction unit 101212 determines a mode list including a plurality of intra modes.

In at least one implementation, the intra modes in the mode list may be predefined in the destination device 12 and the source device 11. For example, the intra modes may be predefined as a planar mode, a DC mode, and a plurality of directional modes.

At block 33, the intra prediction unit 101212 selects at least one of the intra modes based on the block size.

In at least one implementation, the intra prediction unit 101212 may determine the selected intra modes based on a comparison between the block size and a predefined size. When the block size is larger than the predefined size, the selected intra modes may be at least one first selected mode. When the block size is smaller than the predefined size, the selected intra modes may be at least one second selected mode different from the at least one first selected mode.

In at least one implementation, the intra prediction unit 101212 may determine the selected intra modes based on a comparison between the block width and the block height. When the block width is longer than the block height, the selected intra modes may be at least one third selected mode. When the block width is shorter than the block height, the selected intra modes may be at least one fourth selected mode different from the at least one third selected mode.

At block 34, the intra prediction unit 101212 removes the selected at least one of the intra modes from the mode list to generate an adjusted list including each of the unselected intra modes.

In at least one implementation, the unselected intra modes may be a plurality of remaining intra modes in the mode list, when the intra prediction unit 101212 removes all of the selected intra modes from the mode list. In the implementation, the intra prediction unit 101212 may generate the adjusted list including the unselected intra modes. In at least one implementation, the intra prediction unit 101212 may add a plurality of additional modes based on the block size into the adjusted list. In at least one implementation, the intra prediction unit 101212 may set a second intra prediction index for each of the unselected intra modes and the addition modes.

At block 35, the intra prediction unit 101212 generates a plurality of predictors for the block unit based on the adjusted list.

In at least one implementation, the block unit may include a plurality of block elements. In the implementation, each of the block elements may be a pixel element. At least one implementation, the intra prediction unit 101212 may determine, along an orientation derived from the adjusted list for the block unit, one of the predictors based on a plurality of neighboring blocks neighboring with the block unit for each of the block elements. In one implementation, the orientation may be derived from one of the unselected intra modes in the adjusted list. In another implementation, the orientation may be derived from one of the unselected intra modes and the additional modes in the adjusted list. In the implementation, the encoder module 1012 predicts the block unit to generate a plurality of residual samples based on the predictors, and provide the bitstream including a plurality of coefficients corresponding to the residual samples.

In at least one implementation, the encoder module 1012 may perform the mode list adjustment method for intra prediction as shown in FIG. 4. The method in FIG. 4 may be carried out using the configuration illustrated in FIG. 1 and FIG. 10, for example, and various elements of these figures are referenced in explaining the example method. Furthermore, the order of blocks in FIG. 4 is illustrative only and may change. Additional blocks may be added or less blocks may be utilized without departing from this disclosure.

At block 41, the encoder module 1012 determines a block unit in an image frame from video data, and determine a plurality of neighboring blocks neighboring with the block unit.

In at least one implementation, the video data may be a video. The source device 11 may receive the video by the source module 111. The encoder module 1012 determines the image frame from the video, and divides the image frame to determine the block unit via the partition unit 101211, and then the encoder module 1012 provides a plurality of partition indications into a bitstream based on a partition result of the partition unit 101211.

In at least one implementation, the prediction process unit 10121 of the source device 11 determines the neighboring blocks neighboring with the block unit and included in at least one reference line. In at least one implementation, the neighboring blocks may be reconstructed prior to reconstructing the block unit, so the neighboring blocks may be a plurality of reference samples for reconstructing the block unit. In at least one implementation, the block unit may be reconstructed prior to reconstructing some of the neighboring blocks, so the intra prediction unit 101212 may generate the reference samples of the block unit for the unreconstructed neighboring blocks by padding with the reconstructed neighboring blocks.

At block 42, the intra prediction unit 101212 determines a mode list including a plurality of intra modes, and determine prediction information of the neighboring blocks.

In at least one implementation, the intra modes in the mode list may be predefined in the destination device 12 and the source device 11. For example, the intra modes may be predefined as a planar mode, a DC mode, and a plurality of directional modes. In addition, the number of directional modes may be equal to 33 or 65, when the encoder module 1012 encodes the video in HEVC or VTM.

In at least one implementation, the prediction information of the neighboring blocks may include a plurality of decoded modes of the neighboring blocks. In one implementation, the prediction information may further include a plurality of prediction modes of the neighboring blocks, when the decoded modes of the neighboring blocks are the intra prediction. In at least one implementation, the intra prediction unit 101212 may determine a plurality of most probable modes (MPMs) based on the prediction modes of the neighboring blocks for the block unit.

In at least one implementation, the prediction information of the neighboring blocks may be any information used to determine whether the neighboring blocks are reconstructed. For example, the intra prediction unit 101212 may directly receive a plurality of reconstructed components of the neighboring blocks generated by the second summer 10125 to determine which of the neighboring blocks has been reconstructed. In one implementations, a specific one of the neighboring blocks may not be used to generate a plurality of reference samples, when the intra prediction unit 101212 does not receive the reconstructed components of the specific neighboring block. In the implementation, the intra prediction unit 101212 may generate the reference samples corresponding to the specific neighboring block by padding with the other neighboring blocks.

At block 43, the intra prediction unit 101212 selects at least one of the intra modes based on the prediction information of the neighboring blocks.

In at least one implementation, each of the directional modes includes an orientation. In at least one implementation, the intra prediction unit 101212 may compare the orientations of the MPMs with the orientations of the directional modes, and determine the selected intra modes based on the comparison between the orientations of the MPMs and the orientations of the directional modes. For example, a specific one of the directional modes may be one of the selected intra modes, if the specific directional mode is far from the MPMs.

In at least one implementation, the intra prediction unit 101212 may determine which of the neighboring blocks has not been reconstructed during reconstructing the block unit.

In the implementation, the intra prediction unit 101212 may further determine which of the intra modes directs from the block unit to the determined neighboring blocks. In at least one implementation, the intra prediction unit 101212 may set the determined intra modes as the selected intra modes.

At block 44, the intra prediction unit 101212 removes the selected at least one of the intra modes from the mode list to generate an adjusted list including each of the unselected intra modes.

In at least one implementation, a plurality of remaining intra modes in the mode list may be the unselected intra modes, when the intra prediction unit 101212 removes all of the selected intra modes from the mode list. In the implementation, the intra prediction unit 101212 may generate the adjusted list to include the unselected intra modes. In at least one implementation, the intra prediction unit 101212 may add a plurality of additional modes based on the block size into the adjusted list. In at least one implementation, the intra prediction unit 101212 may set a second intra prediction index for each of the unselected intra modes.

At block 45, the intra prediction unit 101212 generates a plurality of predictors for the block unit based on the adjusted list.

In at least one implementation, the block unit may include a plurality of block elements. In the implementation, each of the block elements may be a pixel element. In at least one implementation, the intra prediction unit 101212 may determine, along an orientation derived from the adjusted list for the block unit, one of the predictors based on a plurality of neighboring blocks neighboring with the block unit for each of the block elements. In one implementation, the orientation may be derived from one of the unselected intra modes in the adjusted list. In another implementation, the orientation may be derived from one of the unselected intra modes and the additional modes in the adjusted list derived according to the block size. In the implementation, the encoder module 1012 predicts the block unit to generate a plurality of residual samples based on the predictors, and provide the bitstream including a plurality of coefficients corresponding to the residual samples.

In at least one implementation, the encoder module 1012 may perform the multi-reference line prediction methods for intra prediction as shown in FIG. 5 and FIG. 7. The methods in FIG. 5 and FIG. 7 may be carried out using the configuration illustrated in FIG. 1 and FIG. 10, for example, and various elements of these figures are referenced in explaining the example method. In addition, the procedure and the result for the method in FIG. 5 carried out using the configuration illustrated in FIG. 1 and FIG. 10 is identical to those for the method in FIG. 5 carried out using the configuration illustrated in FIG. 1 and FIG. 2, and the procedure and the result for the method in FIG. 7 carried out using the configuration illustrated in FIG. 1 and FIG. 10 is identical to those for the method in FIG. 7 carried out using the configuration illustrated in FIG. 1 and FIG. 2. Furthermore, the orders of blocks in FIG. 5 and FIG. 7 for the encoder module 1012 are illustrative only and may change. Additional blocks may be added or less blocks may be utilized without departing from this disclosure.

In at least one implementation, the encoder module 1012 may perform the mode list adjustment method for intra prediction as shown in FIG. 9A. The method in FIG. 9A may be carried out using the configuration illustrated in FIG. 1 and FIG. 10, for example, and various elements of these figures are referenced in explaining the example method. Furthermore, the order of blocks in FIG. 9A is illustrative only and may change. Additional blocks may be added or less blocks may be utilized without departing from this disclosure.

At block 911, the encoder module 1012 determines a block unit having a block size in an image frame from video data.

In at least one implementation, the video data may be a video. The source device 11 may receive the video by the source module 111. The encoder module 1012 determines the image frame from the video, and divides the image frame to determine the block unit.

In at least one implementation, the prediction process unit 10121 of the source device 11 determines the block unit from the video via the partition unit 101211, and then the encoder module 1012 provides a plurality of partition indications into a bitstream based on a partition result of the partition unit 101211. In at least one implementation, the block size may include a block height and a block width.

At block 912, the intra prediction unit 101212 determines a mode list including a plurality of intra modes.

In at least one implementation, the intra modes in the mode list may be predefined in the destination device 12 and the source device 11. For example, the intra modes may be predefined as a planar mode, a DC mode, and a plurality of directional modes.

At block 913, the intra prediction unit 101212 determines a plurality of additional modes based on the block size.

In at least one implementation, the additional modes determined by the intra prediction unit 101212 may be set as a plurality of first added modes identical to the additional modes determined by the destination device 12, when the intra prediction unit 101212 determines that the block size is larger than the predefined size. In at least one implementation, the additional modes determined by the intra prediction unit 101212 may be set as a plurality of second added modes identical to the additional modes determined by the destination device 12, when the intra prediction unit 101212 determines that the block size is smaller than the predefined size. In the implementation, each of the second added modes may be different from the first added modes. In at least one implementation, the additional modes determined by the intra prediction unit 101212 may be set as a plurality of third added modes identical to the additional modes determined by the destination device 12, when the intra prediction unit 101212 determines that the block width is longer than the block height. In at least one implementation, the additional modes determined by the intra prediction unit 101212 may be set as a plurality of fourth added modes identical to the additional modes determined by the destination device 12, when the intra prediction unit 101212 determines that the block size is shorter than the predefined size. In the implementation, each of the fourth added modes may be different from the third added modes.

In at least one implementation, the intra prediction unit 101212 may divide the directional modes into a plurality of intra prediction regions. In at least one implementation, the intra prediction unit 101212 may determine an inserted region based on the comparison between the block size and the predefined size, and generate the additional modes based on the inserted region. In the implementation, the inserted region determined by the intra prediction unit 101212 is identical to the inserted region determined by the destination device 12. In at least one implementation, in FIG. 8, the third added modes may be created in a first added region 856, when the block width is longer than the block height. In addition, the fourth added modes may be created in a second added region 851, when the block width is shorter than the block height.

At block 914, the intra prediction unit 101212 adds the additional modes into the mode list to generate an adjusted list including each of the intra modes.

In at least one implementation, the intra prediction unit 101212 may set a second intra prediction index for each of the additional modes, when the additional modes are added into the mode list. In at least one implementation, each of the intra modes has the first intra prediction index. In at least one implementation, the intra modes may include N non-directional modes having the first intra prediction indices set from 0 to N−1, and M directional modes having the first intra prediction indices set from N to N+M−1. In at least one implementation, the intra modes may include two non-directional modes having the first intra prediction indices set as zero and one, and 65 directional modes having the first intra prediction indices as 2 to 66, when N is equal to 2 and M is equal to 65 in VTM.

In at least one implementation, the second intra prediction indices may be set from N+M to N+M+K, when the number of the additional modes is equal to K. In one implementation, the second intra prediction indices may be set from N+65 to N+K+64, when M is equal to 65 in VTM.

At block 915, the intra prediction unit 101212 generates a plurality of predictors for the block unit based on the adjusted list.

In at least one implementation, the block unit may include a plurality of block elements. In the implementation, each of the block elements may be a pixel element. In at least one implementation, the intra prediction unit 101212 may determine, along an orientation derived from the adjusted list for the block unit, one of the predictors based on a plurality of neighboring blocks neighboring with the block unit for each of the block elements. In one implementation, the orientation may be derived from one of the intra modes and the additional modes in the adjusted list. In the implementation, the encoder module 1012 predicts the block unit to generate a plurality of residual samples based on the predictors, and provide the bitstream including a plurality of coefficients corresponding to the residual samples.

In at least one implementation, the encoder module 1012 may perform the mode list adjustment method for intra prediction as shown in FIG. 9B. The method in FIG. 9B may be carried out using the configuration illustrated in FIG. 1 and FIG. 10, for example, and various elements of these figures are referenced in explaining the example method. Furthermore, the order of blocks in FIG. 9B is illustrative only and may change. Additional blocks may be added or less blocks may be utilized without departing from this disclosure.

At block 921, the encoder module 1012 determines a block unit in an image frame from video data, and determine a plurality of neighboring blocks neighboring with the block unit.

In at least one implementation, the video data may be a video. The source device 11 may receive the video by the source module 111. The encoder module 1012 determines the image frame from the video, and divides the image frame to determine the block unit via the partition unit 101211, and then the encoder module 1012 provides a plurality of partition indications into a bitstream based on a partition result of the partition unit 101211.

In at least one implementation, the prediction process unit 10121 of the source device 11 determines the neighboring blocks neighboring with the block unit and included in at least one reference line. In at least one implementation, the neighboring blocks may be reconstructed prior to reconstructing the block unit, so the neighboring blocks may be a plurality of reference samples for reconstructing the block unit. In at least one implementation, the block unit may be reconstructed prior to reconstructing some of the neighboring blocks, so the intra prediction unit 101212 may generate the reference samples of the block unit for the unreconstructed neighboring blocks by padding with the reconstructed neighboring blocks.

At block 922, the intra prediction unit 101212 determines a mode list including a plurality of intra modes, and determine prediction information of the neighboring blocks.

In at least one implementation, the intra modes in the mode list may be predefined in the destination device 12 and the source device 11. For example, the intra modes may be predefined as a planar mode, a DC mode, and a plurality of directional modes.

In at least one implementation, the prediction information of the neighboring blocks may include a plurality of decoded modes of the neighboring blocks. In one implementation, the prediction information may further include a plurality of prediction modes of the neighboring blocks, when the decoded modes of the neighboring blocks are the intra prediction. In at least one implementation, the intra prediction unit 101212 may determine a plurality of most probable modes (MPMs) based on the prediction modes of the neighboring blocks for the block unit.

In at least one implementation, the prediction information of the neighboring blocks may be any information used to determine whether the neighboring blocks are reconstructed. For example, the intra prediction unit 101212 may directly receive a plurality of reconstructed components of the neighboring blocks generated by the second summer 10125. In one implementations, a specific one of the neighboring blocks may not be used to generate a plurality of reference samples, when the intra prediction unit 101212 does not receive the reconstructed components of the specific neighboring block. In the implementation, the intra prediction unit 101212 may generate the reference samples corresponding to the specific neighboring block by padding with the other neighboring blocks.

At block 923, the intra prediction unit 101212 determines a plurality of additional modes based on the prediction information of the neighboring blocks.

In at least one implementation, each of the intra modes including the MPMs and the directional modes include an orientation. In at least one implementation, the intra prediction unit 101212 may compare the orientations of the MPMs with the orientations of the directional mode. In at least one implementation, the intra prediction unit 101212 may determine the additional modes based on the comparison between the orientations of the MPMs and the orientations of the directional modes. In one implementation, a new directional mode close to the MPMs mode may be created.

In at least one implementation, the intra prediction unit 101212 may determine which of the neighboring blocks has not been reconstructed, and determine which of the intra modes directs from the block unit to the determined neighboring blocks. In the implementation, the intra prediction unit 101212 may determine the additional modes based on the comparison between the orientations of the determined intra modes and the orientations of the directional modes. In one implementation, a new directional mode far from the determined intra modes may be created.

In the at least one implementation, the intra prediction unit 101212 may divide the directional modes into a plurality of intra prediction regions. In at least one implementation, the intra prediction unit 101212 may determine an inserted region based on the comparison between the orientations of the MPMs and the orientations of the directional modes and generate the additional modes based on the inserted region. In one implementation, the inserted region may be set to include a specific one of the intra prediction regions, when the specific intra prediction region includes most of the MPMs of the block unit.

In at least one implementation, the intra prediction unit 101212 may determine which of the neighboring blocks has not been reconstructed, and determine which of the intra modes directs from the block unit to the determined neighboring blocks. In the implementation, the intra prediction unit 101212 may further determine which of the intra prediction regions includes the determined intra modes. In one implementation, the inserted region may be different from the determined intra prediction regions. In another implementation, the inserted region may be far from the determined intra prediction regions.

At block 924, the intra prediction unit 101212 adds the additional modes into the mode list to generate an adjusted list including each of the intra modes.

In at least one implementation, the intra prediction unit 101212 may set a second intra prediction index for each of the additional modes, when the additional modes are added into the mode list. In at least one implementation, each of the intra modes has the first intra prediction index. In at least one implementation, the intra modes may include N non-directional modes having the first intra prediction indices set from 0 to N−1, and M directional modes having the first intra prediction indices set from N to N+M−1. In at least one implementation, the intra modes may include two non-directional modes having the first intra prediction indices set as zero and one, and 65 directional modes having the first intra prediction indices as 2 to 66, when N is equal to 2 and M is equal to 65 in VTM.

In at least one implementation, the second intra prediction indices may be set from N+M to N+M+K, when the number of the additional modes is equal to K. In one implementation, the second intra prediction indices may be set from N+65 to N+K+64, when M is equal to 65 in VTM.

At block 925, the intra prediction unit 101212 generates a plurality of predictors for the block unit based on the adjusted list.

In at least one implementation, the block unit may include a plurality of block elements. In the implementation, each of the block elements may be a pixel element. In at least one implementation, the intra prediction unit 101212 may determine, along an orientation derived from the adjusted list for the block unit, one of the predictors based on a plurality of neighboring blocks neighboring with the block unit for each of the block elements. In one implementation, the orientation may be derived from one of the intra modes and the additional modes in the adjusted list. In the implementation, the encoder module 1012 predicts the block unit to generate a plurality of residual samples based on the predictors, and provide the bitstream including a plurality of coefficients corresponding to the residual samples.

From the above description, it is manifest that various techniques may be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method of decoding a bitstream by an electronic device, the method comprising:
   determining a block unit from an image frame according to the bitstream, the block unit having a block height and a block width;
   determining a mode list including a plurality of intra modes, wherein each of the plurality of intra modes has a first intra prediction index;
   selecting at least one of the plurality of intra modes from the mode list based on a comparison between the block height and the block width;
   removing the selected at least one of the plurality of intra modes to generate an adjusted list including a plurality of unselected modes;
   adding a plurality of additional modes into the adjusted list;
   determining a second intra prediction index for each of the plurality of additional modes;

determining a first intra prediction indication of the block unit from the bitstream, wherein the first intra prediction indication indicates one of the plurality of first intra prediction indices and the plurality of second intra prediction indices corresponding to a specific one of the plurality of unselected modes and the plurality of additional modes; and reconstructing the block unit of the image frame based on the specific one of the plurality of unselected modes and the plurality of additional modes in the adjusted list.

2. The method according to claim 1, further comprising:
determining a second intra prediction indication of the block unit from the bitstream, wherein the second intra prediction indication indicates one of the plurality of first intra prediction indices corresponding to a specific one of the plurality of unselected modes; and reconstructing the image frame having the block unit based on the specific one of the plurality of unselected modes.

3. The method according to claim 1, wherein a number of the removed selected at least one of the plurality of intra modes is equal to a number of the plurality of additional modes.

4. The method according to claim 1, wherein the each second intra prediction index is set from N+M, when the plurality of intra modes includes N non-directional modes having the plurality of first intra prediction indices set from 0 to N−1 and M directional modes having the plurality of first intra prediction indices set from N to (N−1)+M, and each of N and M is an integer greater than zero.

5. The method according to claim 4, wherein each second intra prediction index is set from N+65 to N+(K+64), when a number of the M directional modes is equal to 65 and the number of the plurality of additional modes is equal to K being an integer greater than zero.

6. The method according to claim 1, further comprising:
dividing the plurality of intra modes into a plurality of intra prediction regions;
determining that the selected at least one of the plurality of intra modes is selected from a first one of the plurality of intra prediction regions, when the block width is greater than the block height; and
determining that the selected at least one of the plurality of intra modes is selected from a second one of the plurality of intra prediction regions different from the first one of the plurality of intra prediction regions, when the block height is greater than the block width.

7. The method according to claim 6, wherein a first angle between a horizontal direction and each of the plurality of intra modes in the first one of the plurality of intra prediction regions is equal to or less than 45 degrees, and a second angle between a vertical direction and each of the plurality of intra modes in the second one of the plurality of intra prediction regions is equal to or less than 45 degrees.

8. An electronic device for decoding a bitstream, the electronic device comprising:
at least one processor; and
a storage device coupled to the at least one processor and storing a plurality of instructions which, when executed by the at least one processor, causes the at least one processor to:
determine a block unit from an image frame according to the bitstream, the block unit having a block height and a block width;
determine a mode list including a plurality of intra modes, wherein each of the plurality of intra modes has a first intra prediction index;
determine an intra prediction indication from the bitstream for indicating a predicted mode of the block unit;
compare the block height and the block width;
based on the comparison between the block height and the block width, select at least one of the plurality of intra modes from the mode list and add a plurality of additional modes into an adjusted list generated from the mode list;
determine a second intra prediction index for each of the plurality of additional modes;
determine, based on the intra prediction indication and the comparison between the block height and the block width, whether the predicted mode is selected from the plurality of intra modes to determine the predicted mode, wherein the intra prediction indication indicates a specific one of the plurality of first intra prediction indices and the plurality of second intra prediction indices corresponding to a specific one of a plurality of unselected modes and the plurality of additional modes; and
reconstruct the block unit of the image frame based on the predicted mode.

9. The electronic device according to claim 8, wherein the plurality of instructions, when executed by the at least one processor, further causes the at least one processor to:
determine the selected at least one of the plurality of intra modes to be removed from the mode list to generate the adjusted list and the plurality of unselected modes retained in the adjusted list, when the block width is different from the block height;
determine the plurality of additional modes added into the adjusted list, when the block width is different from the block height;
derive the specific one of the plurality of first intra prediction indices and the plurality of second intra prediction indices based on the intra prediction indication indicating a predicted index; and
determine the predicted mode based on the specific one of the plurality of first intra prediction indices and the plurality of second intra prediction indices.

10. The electronic device according to claim 9, wherein the plurality of intra modes includes N non-directional modes and M directional modes, and each of N and M is an integer greater than zero.

11. The electronic device according to claim 10, wherein the specific one of the plurality of first intra prediction indices and the plurality of second intra prediction indices is greater than or equal to 0 and less than N+M, when the predicted index is identical to one of the plurality of first intra prediction indices corresponding to one of the plurality of unselected modes.

12. The electronic device according to claim 10, wherein the specific one of the plurality of first intra prediction indices and the plurality of second intra prediction indices is greater than or equal to N+M, when the predicted index is different from each of the plurality of first intra prediction indices corresponding to the plurality of unselected modes.

13. The electronic device according to claim 10, wherein the plurality of first intra prediction indices of the N non-directional modes are set from 0 to N−1, the plurality of first intra prediction indices of the M directional modes are set from N to N+64, and the plurality of second intra prediction indices of the plurality of additional modes are set from N+65 to N+(K+64), when a number of the plurality of additional modes is equal to K being an integer greater than zero and M is equal to 65.

14. The electronic device according to claim 9, wherein a number of the plurality of intra modes in the mode list is equal to a sum of the number of the plurality of additional modes and a number of the plurality of unselected modes.

15. A method of decoding a bitstream by an electronic device, the method comprising:
  determining a block unit from an image frame according to the bitstream, the block unit having a block height and a block width;
  determining a mode list including a plurality of intra modes, wherein each of the plurality of intra modes has a first intra prediction index;
  determining an intra prediction indication from the bitstream for indicating a predicted mode of the block unit;
  comparing the block height and the block width;
  based on the comparison between the block height and the block width, selecting at least one of the plurality of intra modes from the mode list and adding a plurality of additional modes into an adjusted list generated from the mode list;
  determining a second intra prediction index for each of the plurality of additional modes;
  determining based on the intra prediction indication and the comparison between the block height and the block width whether the predicted mode is selected from the plurality of intra modes to determine the predicted mode, wherein the intra prediction indication indicates a specific one of the plurality of first intra prediction indices and the plurality of second intra prediction indices corresponding to a specific one of a plurality of unselected modes and the plurality of additional modes; and
  reconstructing the block unit of the image frame based on the predicted mode.

16. The method according to claim 15, further comprising:
  determining the selected at least one of the plurality of intra modes to be removed from the mode list to generate the adjusted list and the plurality of unselected modes retained in the adjusted list, when the block width is different from the block height,
  wherein a number of the plurality of intra modes in the mode list is equal to a sum of a number of the plurality of additional modes and a number of the plurality of unselected modes;
  deriving the specific one of the plurality of first intra prediction indices and the plurality of second intra prediction indices based on the intra prediction indication indicating a predicted index; and
  determining the predicted mode based on the specific one of the plurality of first intra prediction indices and the plurality of second intra prediction indices.

17. The method according to claim 16, wherein the plurality of intra modes includes N non-directional modes and M directional modes, and each of N and M is an integer greater than zero.

18. The method according to claim 17, wherein the specific one of the plurality of the first intra prediction indices and the plurality of second intra prediction indices is greater than or equal to 0 and less than N+M when the predicted index is identical to one of the plurality of the first intra prediction indices corresponding to one of the plurality of unselected modes; and
  the specific one of the plurality of first intra prediction indices and the plurality of second intra prediction indices is greater than or equal to N+M, when the predicted index is different from each of the plurality of first intra prediction indices corresponding to the plurality of unselected modes.

* * * * *